United States Patent
Kawamoto

(10) Patent No.: US 11,414,837 B2
(45) Date of Patent: Aug. 16, 2022

(54) IMAGE PROCESSING SYSTEM, DISPLAY DEVICE, IMAGE PROCESSING METHOD, METHOD FOR GENERATING TRAINED MODEL, AND DATASET FOR LEARNING

(71) Applicant: KOMATSU LTD., Tokyo (JP)

(72) Inventor: Shun Kawamoto, Tokyo (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 17/261,701

(22) PCT Filed: Jul. 19, 2019

(86) PCT No.: PCT/JP2019/028510
§ 371 (c)(1),
(2) Date: Jan. 20, 2021

(87) PCT Pub. No.: WO2020/044852
PCT Pub. Date: Mar. 5, 2020

(65) Prior Publication Data
US 2021/0292998 A1    Sep. 23, 2021

(30) Foreign Application Priority Data

Aug. 31, 2018   (JP) .............................. JP2018-163670

(51) Int. Cl.
*E02F 9/26* (2006.01)
*G06T 7/00* (2017.01)
*G06T 7/73* (2017.01)

(52) U.S. Cl.
CPC .............. *E02F 9/26* (2013.01); *G06T 7/0004* (2013.01); *G06T 7/73* (2017.01);
(Continued)

(58) Field of Classification Search
CPC ... E02F 3/439; E02F 9/123; E02F 9/26; E02F 9/261; E02F 9/264; G06T 2207/10012;
(Continued)

(56) References Cited

U.S. PATENT DOCUMENTS

| | | | | |
|---|---|---|---|---|
| 5,142,658 A | * | 8/1992 | McMorran | ........... B65G 63/004 340/687 |
| 10,048,692 B2 | * | 8/2018 | Hamada | .................. E02F 9/205 |

(Continued)

FOREIGN PATENT DOCUMENTS

| | | |
|---|---|---|
| CN | 103900497 A | 7/2014 |
| CN | 107506711 A | 12/2017 |

(Continued)

OTHER PUBLICATIONS

Koyachi, Noriho, and Shigeru Sarata. "Unmanned loading operation by autonomous wheel loader." 2009 ICCAS-SICE. IEEE, 2009. (Year: 2009).*

(Continued)

*Primary Examiner* — Bobbak Safaipour
(74) *Attorney, Agent, or Firm* — Global IP Counselors, LLP

(57) ABSTRACT

An image processing system includes a data acquisition unit and a position specifying unit. The data acquisition unit acquires a captured image showing a drop target of a work machine in which a transport object is dropped. The position specifying unit specifies a position of a predetermined part of the drop target shown in the captured image based on the captured image and a position specifying model. The position specifying model is a trained model, which outputs a position of a predetermined part of a drop target shown in an image when the image is input. A display device may display (Continued)

information regarding the position of the predetermined part of the drop target of the transport object specified by the image processing system.

10 Claims, 20 Drawing Sheets

(52) U.S. Cl.
CPC .............. *G06T 2207/10012* (2013.01); *G06T 2207/20081* (2013.01); *G06T 2207/20084* (2013.01); *G06T 2207/30164* (2013.01)

(58) Field of Classification Search
CPC . G06T 2207/20081; G06T 2207/20084; G06T 2207/30164; G06T 7/0004; G06T 7/73
See application file for complete search history.

(56) References Cited

U.S. PATENT DOCUMENTS

| | | | |
|---|---|---|---|
| 10,330,465 B2* | 6/2019 | Byrne | G06T 7/55 |
| 2015/0262365 A1 | 9/2015 | Shimizu | |
| 2016/0236616 A1* | 8/2016 | Kurihara | G01S 7/40 |
| 2017/0120823 A1* | 5/2017 | Mitsuta | B60R 1/00 |
| 2019/0119087 A1* | 4/2019 | Fischbach | B60R 1/00 |
| 2020/0014888 A1* | 1/2020 | Magal | H04N 7/188 |
| 2021/0002852 A1* | 1/2021 | Nishi | E02F 9/2285 |
| 2021/0040713 A1* | 2/2021 | Yamanaka | E02F 3/435 |
| 2021/0043085 A1* | 2/2021 | Kreiling | E02F 9/2045 |
| 2021/0156121 A1* | 5/2021 | Hayakawa | G06T 7/64 |
| 2021/0248381 A1* | 8/2021 | Barish | G06N 20/00 |
| 2021/0248398 A1* | 8/2021 | Gencaslan | G06T 7/254 |
| 2021/0272315 A1* | 9/2021 | Kawamoto | E02F 3/439 |

FOREIGN PATENT DOCUMENTS

| | | |
|---|---|---|
| CN | 108007345 A | 5/2018 |
| EP | 2 560 384 A1 | 2/2013 |
| EP | 2 808 455 A1 | 12/2014 |
| EP | 3 540 687 A1 | 9/2019 |
| JP | 2000-192514 A | 7/2000 |
| JP | 2015-175598 A | 10/2015 |
| JP | 2016-89559 A | 5/2016 |
| JP | 2016-153984 A | 8/2016 |
| JP | 2018-7078 A | 1/2018 |
| JP | 2018-77829 A | 5/2018 |
| JP | 2018-134712 A | 8/2018 |

OTHER PUBLICATIONS

The International Search Report for the corresponding international application No. PCT/JP2019/028510, dated Oct. 15, 2019.
Wang Linyu et al., "Research on Fusion Matching Object Recognition and Location Based on Binocular Image Multi-Feature Point Fusion", Radio Engineering, Published Date: Aug. 5, 2018, pp. 628-633, No. 8, vol. 48.

* cited by examiner

FIG. 6
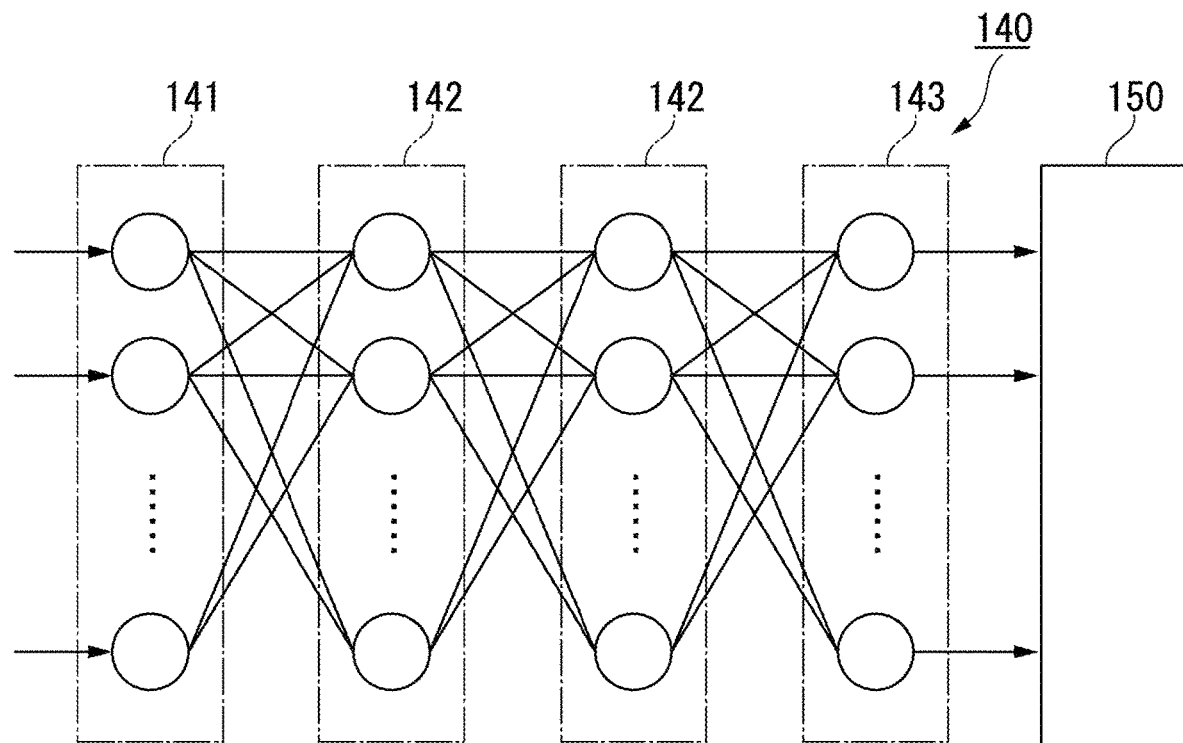
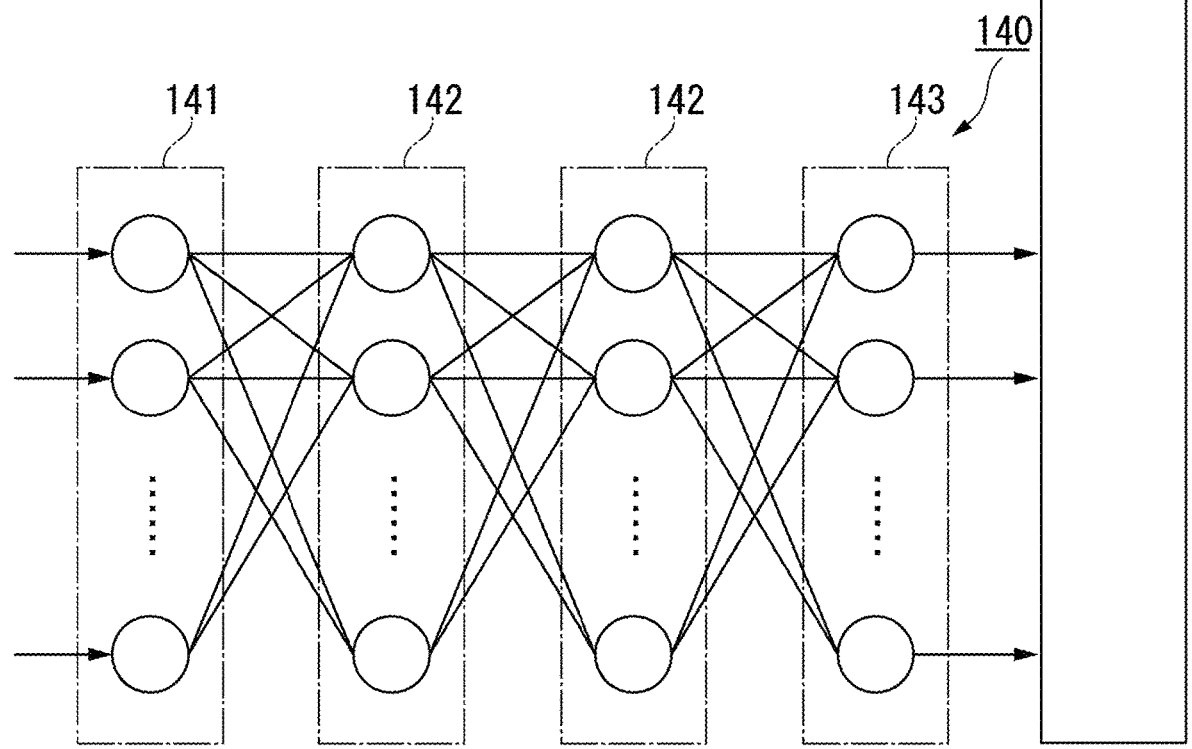

IMAGE PROCESSING SYSTEM, DISPLAY DEVICE, IMAGE PROCESSING METHOD, METHOD FOR GENERATING TRAINED MODEL, AND DATASET FOR LEARNING

This application is a U.S. National stage application of International Application No. PCT/JP2019/028510, filed on Jul. 19, 2019. This U.S. National stage application claims priority under 35 U.S.C. § 119(a) to Japanese Patent Application No. 2018-163670, filed in Japan on Aug. 31, 2018, the entire contents of which are hereby incorporated herein by reference.

BACKGROUND

Field of the Invention

The present invention relates to an image processing system, a display device, an image processing method, a method for generating a trained model, and a dataset for learning.

Background Information

Japanese Unexamined Patent Application, First Publication No. 2000-192514 discloses a technique of extracting an edge from an image captured by an imaging device provided in a hydraulic excavator to specify the position of a dump body of a dump truck.

SUMMARY

In a case where a road is not paved at a site where a loading machine is present, a rut may be generated on a ground surface. When an edge is extracted from an image showing the rut and the dump truck, an edge of the rut is also extracted in addition to an edge of the dump truck. Therefore, in a case where the position of the dump body of the dump truck is specified from the captured image using the technique described in Japanese Unexamined Patent Application, First Publication No. 2000-192514, there is a possibility that the position of the dump body is not properly specified due to the presence of the rut.

An object of the present invention is to provide an image processing system, a display device, an image processing method, a method for generating a trained model, and a dataset for learning capable of robustly specifying a position of a drop target of a transport object.

According to one aspect of the present invention, an image processing system includes a data acquisition unit that acquires a captured image showing a drop target of a work machine in which a transport object is dropped, and a position specifying unit that specifies a position of a predetermined part of the drop target shown in the captured image based on the captured image and a position specifying model which is a trained model which outputs a position of a predetermined part of a drop target shown in an image when the image is input.

According to the above aspect, it is possible to accurately specify the position of a part of a drop target by using a trained model that outputs the position of a predetermined part of the drop target from an image.

BRIEF DESCRIPTION OF DRAWINGS

FIG. 6 is a diagram showing an example of a configuration of a Siamese Network model.

DETAILED DESCRIPTION OF EMBODIMENT(S)

First Embodiment

Hereinafter, embodiments will be described in detail with reference to drawings.

Figure 1:
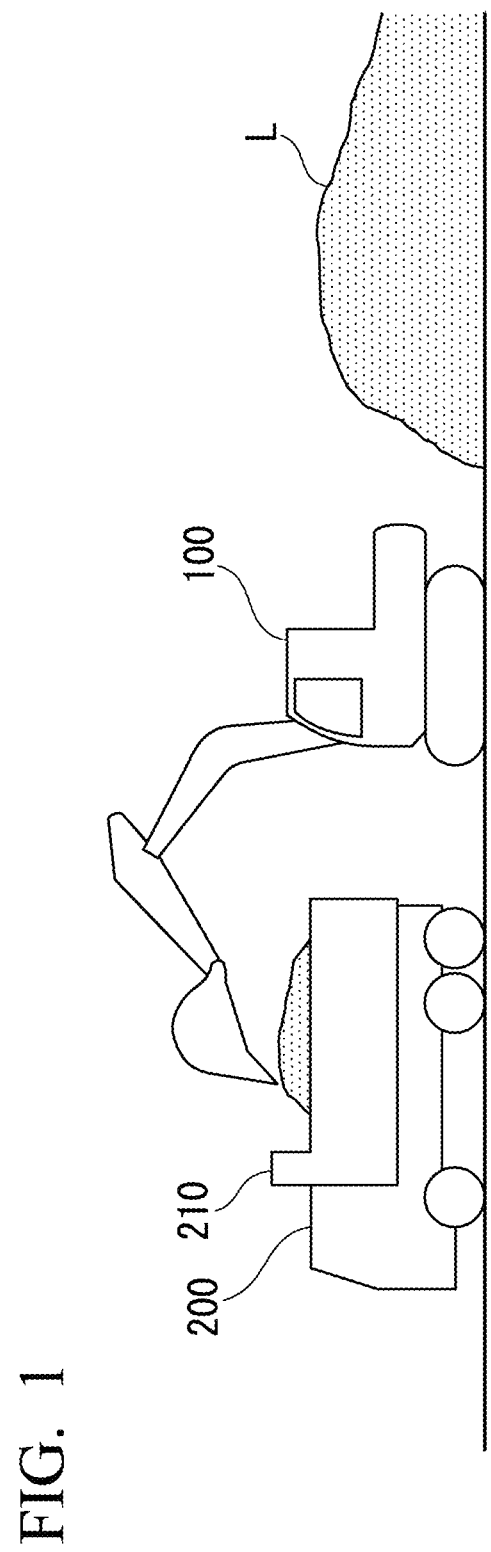
FIG. 1 is a diagram showing a configuration of a loading place according to one embodiment.

FIG. 1 is a diagram showing a configuration of a loading place according to one embodiment.

At a construction site, a hydraulic excavator 100 which is a loading machine and a dump truck 200 which is a transport vehicle are provided. The hydraulic excavator 100 scoops a transport object L such as earth from the construction site and loads the transport object on the dump truck 200. The dump truck 200 transports the transport object L loaded by the hydraulic excavator 100 to a predetermined earth removable place. The dump truck 200 includes a dump body 210 which is a container for accommodating the transport object L. The dump body 210 is an example of a drop target on which the transport object L is dropped. The construction site is an example of a site. The site is a location at which the loading machine works.

(Configuration of Hydraulic Excavator)

Figure 2:
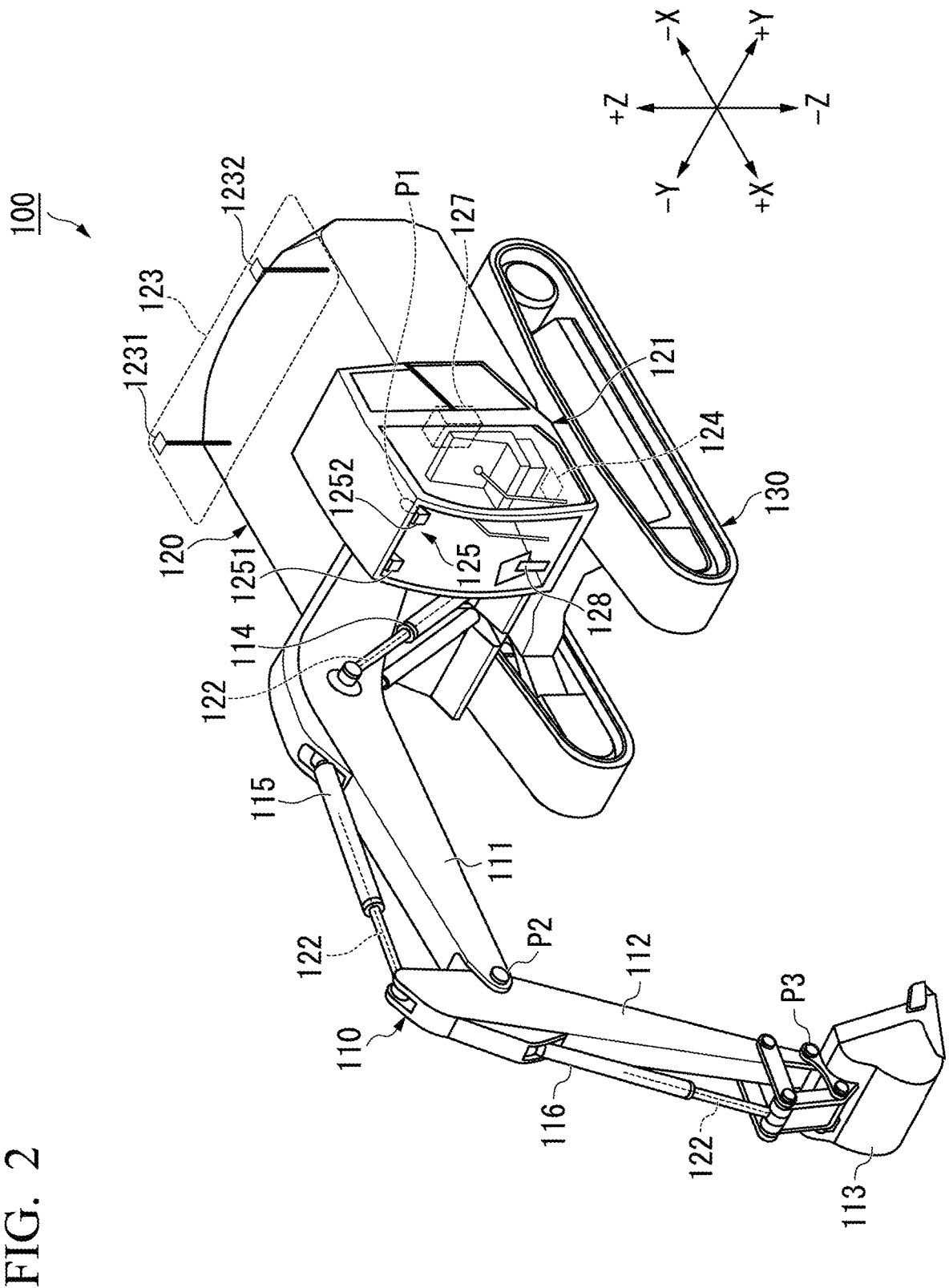
FIG. 2 is an external view of a hydraulic excavator according to one embodiment.

FIG. 2 is an external view of a hydraulic excavator according to one embodiment.

The hydraulic excavator 100 includes work equipment 110 that is hydraulically operated, a swing body 120 that supports the work equipment 110, and a travel body 130 that supports the swing body 120.

The work equipment 110 includes a boom 111, an arm 112, a bucket 113, a boom cylinder 114, an arm cylinder 115, and a bucket cylinder 116.

The boom 111 is a column that supports the arm 112 and the bucket 113. A base end portion of the boom 111 is attached to a front portion of the swing body 120 through a boom pin P1.

The arm 112 couples the boom 111 and the bucket 113 to each other. A base end portion of the arm 112 is attached to a tip end portion of the boom 111 through an arm pin P2.

The bucket 113 is a container having a blade for excavating the earth or the like. A base end portion of the bucket 113 is attached to a tip end portion of the arm 112 through a bucket pin P3.

The boom cylinder 114 is a hydraulic cylinder for operating the boom 111. A base end portion of the boom cylinder 114 is attached to the swing body 120. A tip end portion of the boom cylinder 114 is attached to the boom 111.

The arm cylinder 115 is a hydraulic cylinder for driving the arm 112. A base end portion of the arm cylinder 115 is attached to the boom 111. A tip end portion of the arm cylinder 115 is attached to the arm 112.

The bucket cylinder 116 is a hydraulic cylinder for driving the bucket 113. A base end portion of the bucket cylinder 116 is attached to the arm 112. A tip end portion of the bucket cylinder 116 is attached to the bucket 113.

The swing body 120 is provided with a cab 121 in which an operator rides. The cab 121 is provided in a front portion of the swing body 120 and is positioned on a left-side (+Y side) of the work equipment 110.

(Control System of Hydraulic Excavator)

The hydraulic excavator 100 includes a work equipment position detector 122, a position and azimuth calculator 123, an inclination detector 124, a stereo camera 125, an operation device 126, a control device 127, and a display device 128.

The work equipment position detector 122 detects a posture angle of the work equipment 110. The work equipment position detector 122 according to the first embodiment is a stroke detector that detects a stroke length of each of the boom cylinder 114, the arm cylinder 115, and the bucket cylinder 116. Accordingly, the control device 127, which will be described below, can detect the posture angle of the work equipment 110 based on the stroke length of each of the boom cylinder 114, the arm cylinder 115, and the bucket cylinder 116. On the other hand, the present invention is not limited thereto, and in another embodiment, instead of the stroke detector or in combination with the stroke detector, an angle detector such as an IMU, a rotary encoder, or a level gauge may be used as the work equipment position detector 122.

The position and azimuth calculator 123 calculates a position of the swing body 120 and an azimuth direction of the swing body 120 in which the swing body 120 is directed. The position and azimuth calculator 123 includes a first receiver 1231 and a second receiver 1232 that receive positioning signals from artificial satellites that form a global navigation satellite system (GNSS). The first receiver 1231 and the second receiver 1232 are installed at positions different from each other in the swing body 120. The position and azimuth calculator 123 detects a position of a representative point (origin of a vehicle body coordinate system) of the swing body 120 in a site coordinate system based on the positioning signal received by the first receiver 1231.

The position and azimuth calculator 123 uses the positioning signal received by the first receiver 1231 and the positioning signal received by the second receiver 1232 to calculate the azimuth direction of the swing body 120 as a relationship of an installation position of the second receiver 1232 with respect to the detected installation position of the first receiver 1231. The position and azimuth calculator 123 according to another embodiment may include another device such as a rotary encoder or an IMU, instead of the first receiver 1231 and the second receiver 1232, for measuring the azimuth direction of the swing body 120.

The inclination detector 124 measures acceleration and angular velocity of the swing body 120 to detect an inclination of the swing body 120 (for example, a roll representing rotation about the X-axis, a pitch representing rotation about the Y-axis, and a yaw representing rotation about the Z-axis) based on the measurement result. The inclination detector 124 is installed, for example, on a lower surface of the cab 121. For example, an inertial measurement unit (IMU) which is an inertial measurement device can be used as the inclination detector 124.

The stereo camera 125 is provided in an upper portion of the cab 121. The stereo camera 125 is installed in an upper (+Z direction) and front (+X direction) portion of the cab 121. The stereo camera 125 captures an image in front (+X direction) of the cab 121 through a windshield on a front surface of the cab 121. The stereo camera 125 includes at least one pair of cameras.

The operation device 126 is provided inside the cab 121. The operation device 126 is operated by the operator to supply hydraulic oil to an actuator of the work equipment 110. The hydraulic oil is supplied to the boom cylinder 114, the arm cylinder 115, the bucket cylinder 116, and a swing motor (not shown) according to an operation amount of the operation device 126, and the work equipment 110 and the swing body 120 are driven.

The control device 127 acquires information from the work equipment position detector 122, the position and azimuth calculator 123, the inclination detector 124, and the stereo camera 125 to generate guidance information indicating a position relationship between the bucket 113 and the dump body of the dump truck 200.

The display device 128 displays the guidance information generated by the control device 127.

Depending on the embodiment, the hydraulic excavator 100 may not necessarily include the work equipment position detector 122, the position and azimuth calculator 123, the inclination detector 124, the stereo camera 125, and the display device 128.

(Configuration of Stereo Camera)

In the first embodiment, the stereo camera 125 includes a right-side camera 1251 and a left-side camera 1252. Examples of each camera include a camera using a charge coupled device (CCD) sensor and a complementary metal oxide semiconductor (CMOS) sensor.

The right-side camera 1251 and the left-side camera 1252 are installed at an interval in a left-right direction (Y-axis direction) such that optical axes of the cameras 1221 and 1222 are substantially parallel to a floor surface of the cab 121. The stereo camera 125 is an example of an imaging device. The control device 127 can calculate a distance between the stereo camera 125 and a captured target by using an image captured by the right-side camera 1251 and an image captured by the left-side camera 1252. Hereinafter, the image captured by the right-side camera 1251 is also referred to as a right-eye image. The image captured by the left-side camera 1252 is also referred to as a left-eye image. A combination of the images captured by respective cameras of the stereo camera 125 is also referred to as a stereo image. In another embodiment, the stereo camera 125 may be configured of three or more cameras.

(Configuration of Control Device)

Figure 3:
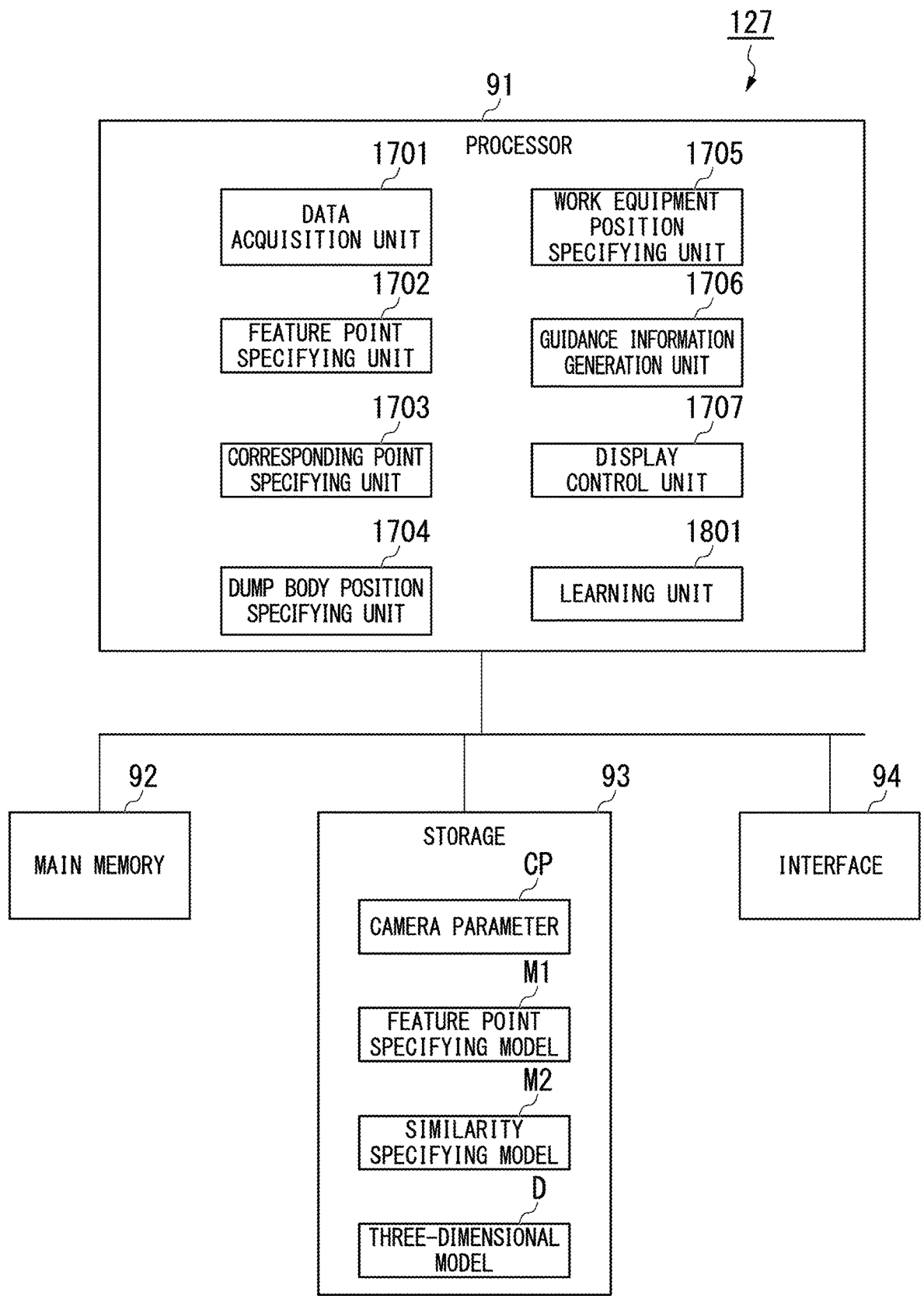
FIG. 3 is a schematic block diagram showing a configuration of a control device according to a first embodiment.

FIG. 3 is a schematic block diagram showing a configuration of the control device according to the first embodiment.

The control device 127 includes a processor 91, a main memory 92, a storage 93, and an interface 94.

The storage 93 stores a program for controlling the work equipment 110. Examples of the storage 93 include a hard disk drive (HDD) and a non-volatile memory. The storage 93 may be an internal medium directly connected to a bus of the control device 127, or may be an external medium connected to the control device 127 through the interface 94 or a communication line. The storage 93 is an example of a storage unit.

The processor 91 reads the program from the storage 93, expands the program in the main memory 92, and executes processing according to the program. The processor 91 secures a storage area in the main memory 92 according to the program. The main memory 92 is an example of the storage unit. The interface 94 is connected to the work equipment position detector 122, the position and azimuth calculator 123, the inclination detector 124, the stereo camera 125, the display device 128, and other peripheral devices, and transmits and receives signals.

With the execution of the program, the processor 91 includes a data acquisition unit 1701, a feature point specifying unit 1702, a corresponding point specifying unit 1703, a dump body position specifying unit 1704, a work equipment position specifying unit 1705, a guidance information generation unit 1706, and a display control unit 1707, and a learning unit 1801. The storage 93 stores a camera parameter CP, a feature point specifying model M1, a similarity specifying model M2, and a three-dimensional model D. The camera parameter is information indicating a position relationship between the swing body 120 and the right-side camera 1251 and a position relationship between the swing body 120 and the left-side camera 1252. The three-dimensional model D is three-dimensional data representing a shape of the dump body 210. In another embodiment, three-dimensional model D representing a shape of the dump truck 200 may be used instead of the shape of the dump body. The storage 93 may not necessarily store the three-dimensional model D.

The program may be for realizing part of functions to be exerted by the control device 127. For example, the program may exert a function by a combination with another program already stored in the storage 93 or a combination with another program installed in another device. In another embodiment, the control device 127 may include a custom large scale integrated circuit (LSI) such as a programmable logic device (PLD) in addition to or instead of the above configuration. Examples of the PLD include a programmable array logic (PAL), a generic array logic (GAL), a complex programmable logic device (CPLD), and a field programmable gate array (FPGA). In this case, some or all of the functions realized by the processor may be realized by the integrated circuit.

The data acquisition unit 1701 acquires data from the work equipment position detector 122, the position and azimuth calculator 123, the inclination detector 124, and the stereo camera 125 through the interface 94. That is, the data acquisition unit 1701 acquires the posture angle of the work equipment 110, the position, azimuth direction, and inclination of the swing body 120, and the stereo image. The data acquisition unit 1701 is an example of an image acquisition unit. Hereinafter, the position, azimuth direction, and inclination of the swing body 120 are also referred to as a posture of the swing body 120. Since the stereo camera 125 is provided on the swing body 120, the position, azimuth direction, and inclination of the swing body 120 are also a posture of the stereo camera 125. That is, the data acquisition unit 1701 is an example of a posture acquisition unit.

Figure 4:
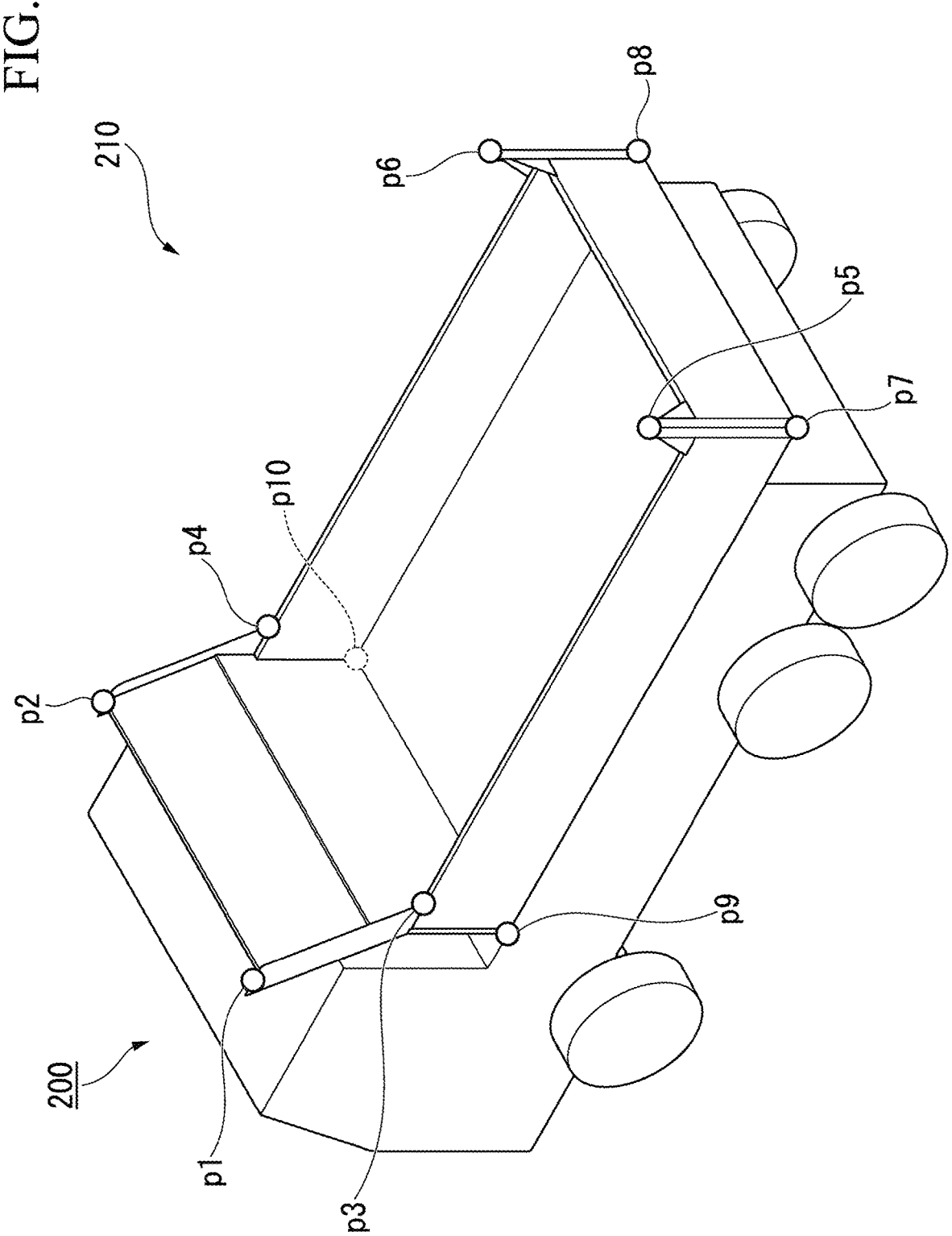
FIG. 4 is a diagram showing an example of feature points of a dump body.

FIG. 4 is a diagram showing an example of feature points of the dump body.

The feature point specifying unit 1702 inputs the right-eye image of the stereo image acquired by the data acquisition unit 1701 to the feature point specifying model M1 stored in the storage 93 to specify positions of a plurality of feature points of the dump body 210 shown in the right-eye image. The feature point specifying unit 1702 is an example of a first position specifying unit. The right-eye image is an example of a first image. Examples of the feature point of the dump body 210 are an upper left end p1 of a front panel of the dump body 210, an upper right end p2 of the front panel, an intersection p3 of a left guard frame of the front panel and a left-side gate, an intersection p4 of a right guard frame of the front panel and a right-side gate, an upper end p5 of a left fixed post of a tailgate, an upper end p6 of a right fixed post of the tailgate, a lower end p7 of the left fixed post of the tailgate, a lower end p8 of the right fixed post of the tailgate, a lower end p9 of a left fixed post of the front panel, and a lower end p10 of a right fixed post of the front panel. That is, the feature point is an example of a position of a predetermined part of the drop target. In another embodiment, only part of the above feature points p1 to p10, for example, the feature points p7, p8, p9, and p10 which are feature points at four corners of the dump body may be specified. The inclination of the dump body 210 can be specified by specifying the feature points having different heights (for example, p7, p8, p9, p10, and p1 or p2).

Figure 5:
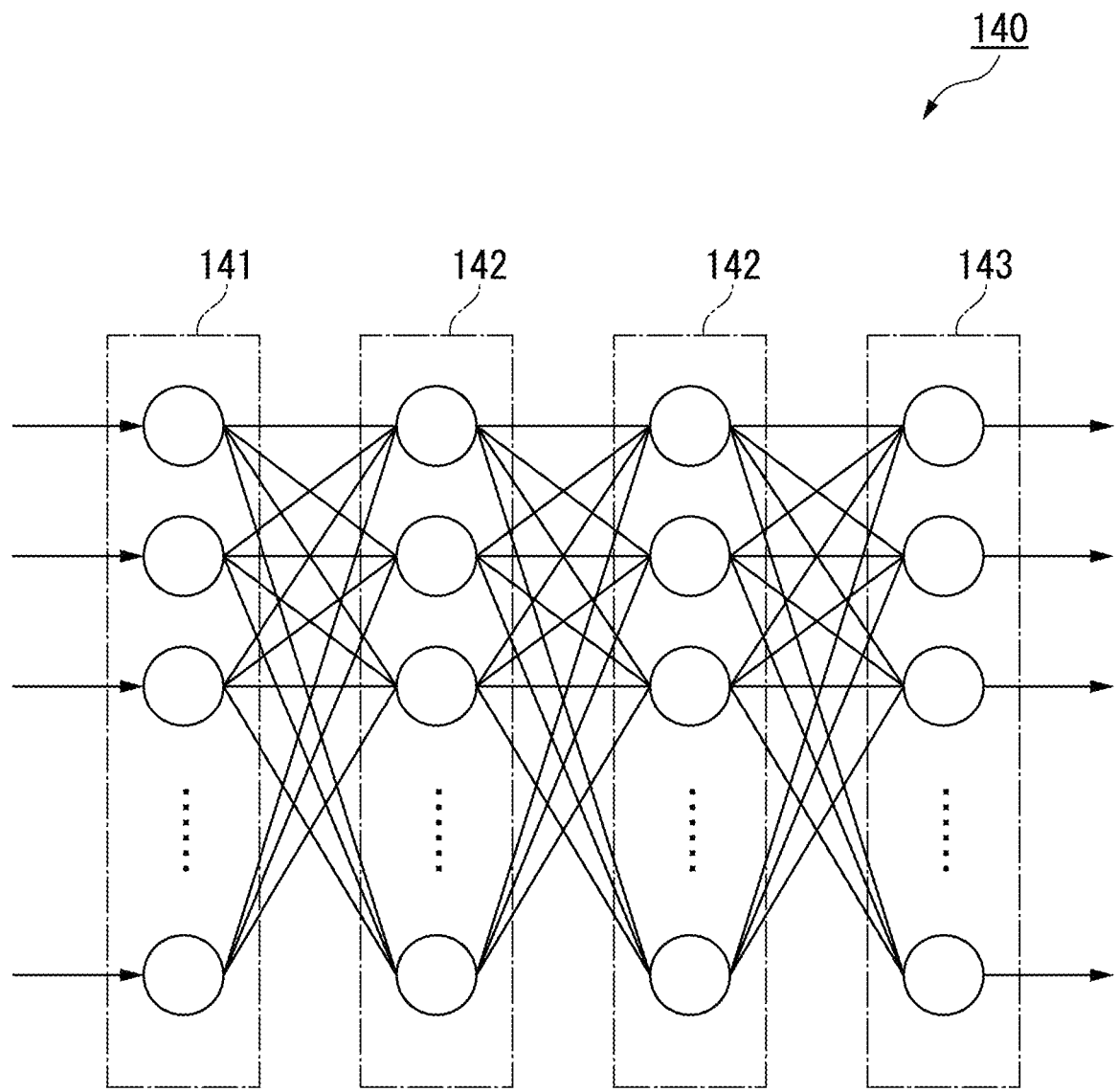
FIG. 5 is an example of a configuration of a neural network.

The feature point specifying model M1 includes a neural network 140 shown in FIG. 5. FIG. 5 is a diagram showing an example of a configuration of a neural network. The feature point specifying model M1 is realized by, for example, a trained model of deep neural network (DNN). The trained model is configured of a combination of a training model and a trained parameter.

As shown in FIG. 5, the neural network 140 includes an input layer 141, one or more intermediate layers 142 (hidden layers), and an output layer 143. Each of the layers 141, 142, 143 includes one or more neurons. The number of neurons in the intermediate layer 142 can be set as appropriate. The output layer 143 can be set as appropriate according to the number of feature points.

Neurons in the layers adjacent to each other are connected to each other, and a weight (connection load) is set for each connection. The number of connected neurons may be set as appropriate. A threshold value is set for each neuron, and an output value of each neuron is determined by whether or not a sum of products of an input value and the weight for each neuron exceeds the threshold value.

An image showing the dump body 210 of the dump truck 200 is input to the input layer 141. For each pixel of the image, an output value indicating a probability of the pixel being the feature point is output to the output layer 143. That is, the feature point specifying model M1 is a trained model which is trained, when an image showing the dump body 210 is input, to output the positions of the feature points of the dump body 210 in the image. The feature point specifying model M1 is trained by using, for example, a dataset for learning with an image showing the dump body 210 of the dump truck 200 as training data and with an image obtained by plotting the positions of the feature points of the dump body 210 as teaching data. The teaching data is an image in which a pixel related to the plot has a value indicating that the probability of the pixel being the feature point is 1, and other pixel has a value indicating that the probability of the pixel being the feature point is 0. The teaching data may be information of which a pixel related to the plot has a value indicating that the probability of the pixel being the feature point is 1, and other pixel has a value indicating that the probability of the pixel being the feature point is 0, and may not necessarily be an image. In the present embodiment, "training data" refers to data input to the input layer during training of the training model. In the present embodiment, "teaching data" is data which is a correct answer for comparison with the value of the output layer of the neural network 140. In the present embodiment, "dataset for learning" refers to a combination of the training data and the teaching data. The trained parameters of the feature point specifying model M1 obtained by training are stored in the storage 93. The trained parameters include, for example, the number of layers of the neural network 140, the number of neurons in each layer, the connection relationship between the neurons, the weight of each connection between the neurons, and the threshold value of each neuron.

For example, a DNN configuration used for detecting a facial organ or a DNN configuration used for estimating a posture of a person can be used as the configuration of the neural network 140 of the feature point specifying model M1. The feature point specifying model M1 is an example of a position specifying model. The feature point specifying model M1 according to another embodiment may be trained by unsupervised learning or reinforcement learning.

The corresponding point specifying unit 1703 specifies positions of the plurality of feature points of the dump body 210 shown in the left-eye image based on the stereo image and the positions of the feature points in the right-eye image specified by the feature point specifying unit 1702. The corresponding point specifying unit 1703 is an example of a second position specifying unit. The left-eye image is an example of a second image. For example, the corresponding point specifying unit 1703 specifies the positions of the plurality of feature points of the dump body 210 shown in the left-eye image by the following method. First, the corresponding point specifying unit 1703 divides the left-eye image into a plurality of partial images (partial left-eye images) of a predetermined size. Next, the corresponding point specifying unit 1703 uses the similarity specifying model M2 to calculate similarity between each partial left-eye image and each partial image (partial right-eye image) of the right-eye image including the feature point specified by the feature point specifying unit 1702. The corresponding point specifying unit 1703 extracts a partial left-eye image having the highest degree of similarity from the partial left-eye images for each partial right-eye image. The corresponding point specifying unit 1703 specifies a position in the left-eye image where the extracted partial left-eye image is present as the position of the feature point of the dump body 210 shown in the left-eye image. At this time, the corresponding point specifying unit 1703 may calculate the similarity only for the partial left-eye image located on the same epipolar line as the corresponding partial right-eye image, among the plurality of partial left-eye images.

The similarity specifying model M2 is realized by, for example, the trained model of deep neural network (DNN). For example, a Siamese Network model can be used as the DNN configuration of the similarity specifying model M2. FIG. 6 is a diagram showing an example of a configuration of the Siamese Network model. The similarity specifying model M2 is a Siamese Network model including two neural networks 140 for calculating a feature amount from an input image, and a distance calculation unit 150. A partial image is input to the input layer 141 of each neural network 140 of the similarity specifying model M2. An output value indicating the feature amount of the partial image is output from the output layer 143 of each neural network 140. The distance calculation unit 150 calculates a distance between the feature amounts output from the neural networks 140. The distance between the feature amounts of the partial images is equivalent to the similarity of the partial images. The distance may be represented by, for example, a Euclidean distance, cosine similarity, and the like. The similarity specifying model M2 is trained using a combination of two partial images and the similarity of the two partial images as teaching data. That is, in the similarity specifying model M2, the training is performed by changing the parameters of the neural network 140 such that values of the feature amounts are closer as the similarity between the two partial images is higher and the values of the feature amounts are farther as the similarity between the two partial images is lower. The trained parameters of the similarity specifying model M2 obtained by the training is stored in the storage 93.

The training of the similarity specifying model M2 may not necessarily use the image showing the dump body 210. The similarity specifying model M2 is an example of a corresponding position specifying model. In another embodiment, the corresponding point specifying unit 1703 may specify the positions of the plurality of feature points of the dump body 210 shown in the left-eye image by using an image feature amount, such as oriented fast and rotated brief (ORB) and scale invariant feature transform (SIFT), or a template matching method, such as sum of absolute difference (SAD), sum of squared difference (SSD), and Normalized Cross Correlation (NCC).

The dump body position specifying unit 1704 uses the feature points on the right-eye image specified by the feature point specifying unit 1702, the feature points on the left-eye image specified by the corresponding point specifying unit 1703, the camera parameter stored in the storage 93, and the posture information of the swing body 120 to specify the position of the dump body 210 in the site coordinate system. Specifically, the dump body position specifying unit 1704 specifies the position of the dump body 210 in the site coordinate system by the following method. First, the dump body position specifying unit 1704 specifies the positions of the feature points in the vehicle body coordinate system by triangulation based on the feature points on the right-eye image specified by the feature point specifying unit 1702, the feature points on the left-eye image specified by the corresponding point specifying unit 1703, and the camera parameter stored in the storage 93. Next, the dump body position specifying unit 1704 converts the positions of the feature points in the vehicle body coordinate system into the positions of the feature points in the site coordinate system based on the posture information of the swing body 120. At this time, the dump body position specifying unit 1704 can specify the position of the dump body 210 by specifying at least three feature points of the dump body 210. For example, the dump body position specifying unit 1704 can specify the position of the dump body 210 in the site coordinate system by disposing the three-dimensional model in a virtual space represented by the site coordinate system so as to align feature points of the three-dimensional model of the dump truck 200 with the at least three feature points.

The dump body position specifying unit 1704 according to another embodiment may specify the positions of the feature points in the vehicle body coordinate system or a camera coordinate system. The dump body position specifying unit 1704 is an example of the position specifying unit.

The work equipment position specifying unit 1705 specifies positions of the boom 111, the arm 112, and the bucket 113 in the site coordinate system based on the posture angle of the work equipment 110 and the posture information of the swing body 120 acquired by the data acquisition unit 1701.

The guidance information generation unit 1706 generates the guidance information indicating the position relationship between the dump body 210 and the bucket 113 based on the position of the dump body 210 specified by the dump body position specifying unit 1704, the positions of the boom 111, the arm 112, and the bucket 113 specified by the work equipment position specifying unit 1705, and the posture information of the swing body 120 acquired by the data acquisition unit 1701.

Figure 7:
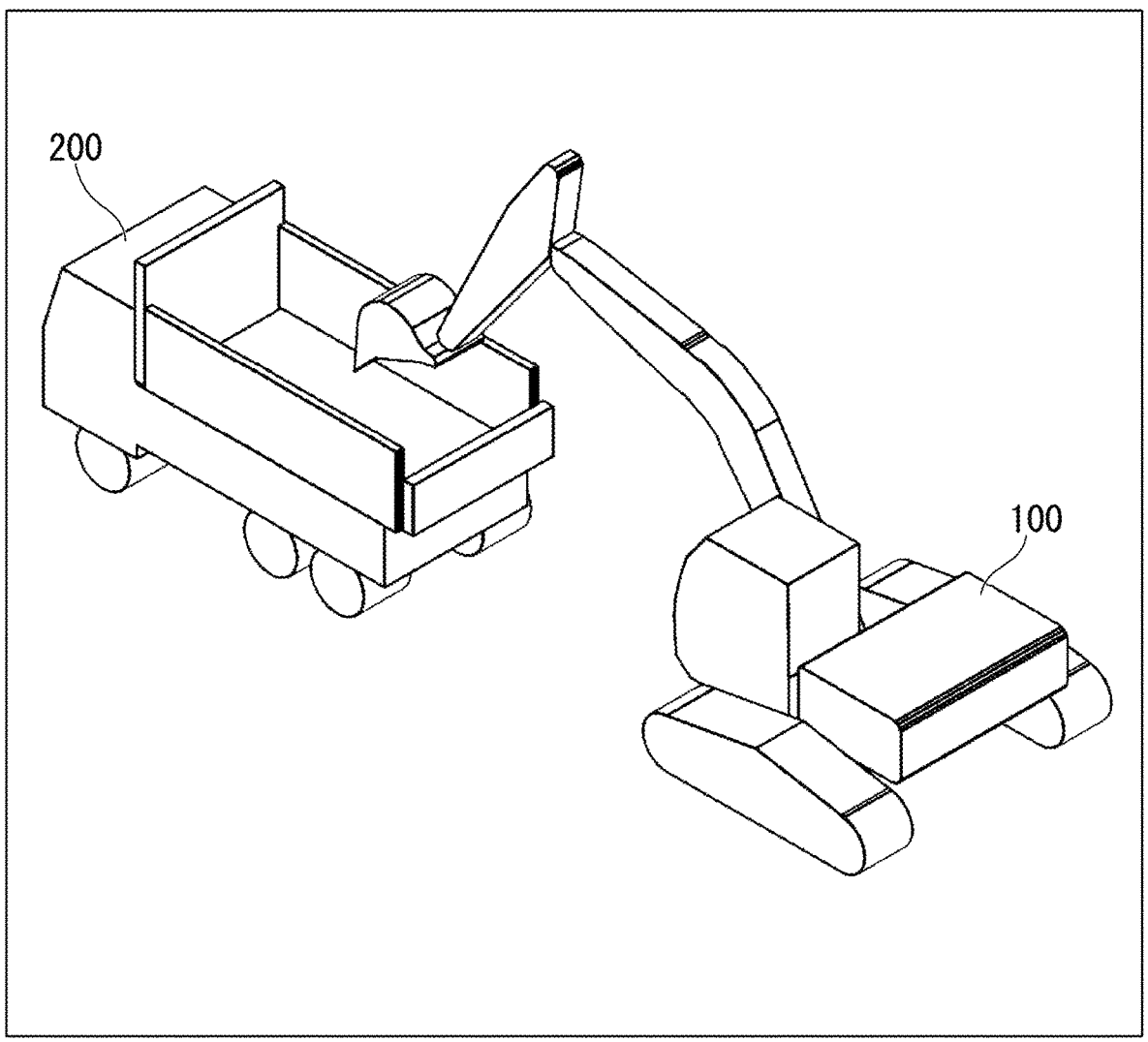
FIG. 7 is an example of guidance information.

FIG. 7 is an example of the guidance information. For example, as shown in FIG. 7, the guidance information generation unit 1706 disposes the three-dimensional model of the hydraulic excavator 100 in the virtual space based on the positions of the boom 111, the arm 112, and the bucket 113 specified by the work equipment position specifying unit 1705 and the posture information of the swing body 120. The guidance information generation unit 1706 disposes the three-dimensional model so as to align a part corresponding to the feature points in the three-dimensional model of the dump truck 200 with the positions of at least three feature points of the dump body 210 specified by the dump body position specifying unit 1704. The guidance information generation unit 1706 renders the hydraulic excavator 100 and the dump truck 200 disposed in the virtual space from an arbitrary viewpoint to generate the guidance information representing the position relationship between the bucket 113 of the hydraulic excavator 100 and the dump body 210 of the dump truck 200. The guidance information generation unit 1706 can appropriately dispose the three-dimensional model even though some feature points are not shown in the captured image by disposing the three-dimensional model using at least three feature points. The guidance information generation unit 1706 can appropriately dispose the three-dimensional model even though some feature points are not shown in the captured image by disposing the three-dimensional model using at least three feature points. The guidance information generation unit 1706 can remove noise even in a case where an erroneous point is extracted as a feature point due to the noise by determining whether the disposition of the three-dimensional model is good or bad based on other specified feature points. In another embodiment, the three-dimensional model may be disposed based on two feature points. The guidance information according to another embodiment may not necessarily graphically draw the position relationship between the bucket 113 and the dump body 210. For example, the guidance information according to another embodiment may be information indicating whether or not the bucket 113 is located in the outer frame of the dump body 210 in a plan view from above. The guidance information according to another embodiment may be display of a target excavation position of the bucket 113 or guidance information for the excavation position of the bucket 113 (for example, information or display indicating a difference between a current position of the bucket 113 and the target excavation position). The guidance information may be information or display indicating how much operation is required to reach the target excavation position. At least only the dump body 210 and the bucket 113 may be displayed.

The display control unit 1707 outputs a display signal for displaying the guidance information to the display device 128.

The learning unit 1801 performs learning processing of the feature point specifying model M1 and the similarity specifying model M2. The learning unit 1801 may be provided in a device separate from the control device 127. In this case, the trained model learned in the separate device will be recorded in the storage 93.

(Display Method)

Figure 8:
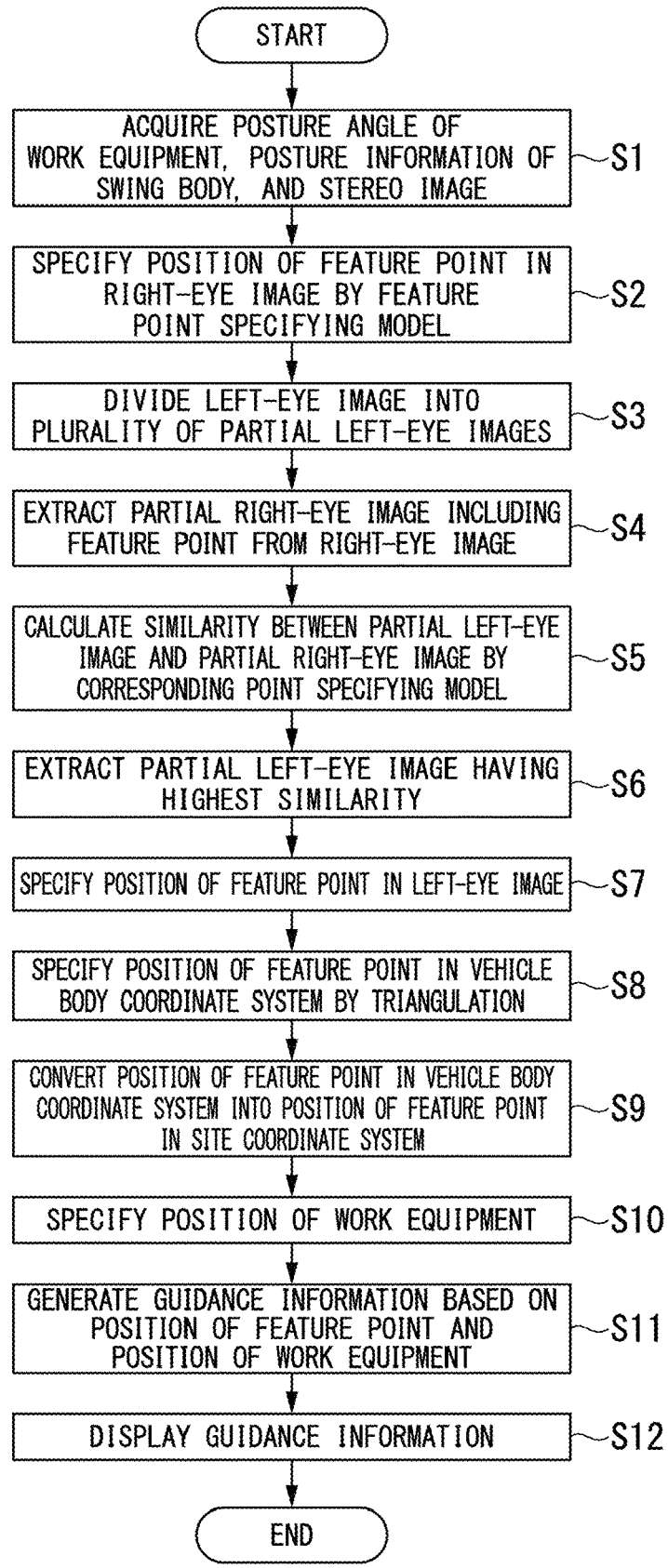
FIG. 8 is a flowchart showing a display method of the guidance information by the control device according to the first embodiment.

FIG. 8 is a flowchart showing a display method of the guidance information by the control device according to the first embodiment.

First, the data acquisition unit 1701 acquires, through the interface 94, the posture angle of the work equipment 110 from the work equipment position detector 122, acquires the position and azimuth direction of the swing body 120 from the position and azimuth calculator 123, acquires the inclination of the swing body 120 from the inclination detector 124, and acquires the stereo image from the stereo camera 125 (step S1). Next, the feature point specifying unit 1702 inputs the right-eye image of the stereo image acquired by the data acquisition unit 1701 to the feature point specifying model M1 stored in the storage 93 to specify the positions of the plurality of feature points of the dump body 210 shown in the right-eye image (step S2).

Next, the corresponding point specifying unit 1703 divides the left-eye image of the stereo image acquired by the data acquisition unit 1701 into the plurality of partial left-eye images (step S3). Next, the corresponding point specifying unit 1703 extracts a plurality of partial right-eye images, which respectively include the feature points specified in step S2, from the right-eye image (step S4). Next, the corresponding point specifying unit 1703 inputs the plurality of partial left-eye images and the plurality of partial right-eye images to the similarity specifying model M2 stored in the storage 93, one by one, to calculate the similarity between the partial left-eye image and the partial right-eye image (step S5). That is, in a case where the number of partial left-eye images is N and the number of partial right-eye images is M, the similarity calculation is executed for N×M combinations. The corresponding point specifying unit 1703 extracts, for each partial right-eye image, the partial left-eye image having the highest similarity to the partial right-eye image among the plurality of partial left-eye images (step S6). The corresponding point specifying unit 1703 specifies the position in the left-eye image where the extracted partial left-eye image is present as the position of the feature point of the dump body 210 shown in the left-eye image (step S7).

The dump body position specifying unit 1704 specifies the positions of the feature points in the vehicle body coordinate system by triangulation based on the feature points on the right-eye image specified in step S2, the feature points on the left-eye image specified in step S7, and the camera parameter stored in the storage 93 (step S8). Next, the dump body position specifying unit 1704 converts the positions of the feature points in the vehicle body coordinate system to the positions of the feature points in the site coordinate system based on the posture information of the swing body 120 (step S9).

The work equipment position specifying unit 1705 specifies the positions of the boom 111, the arm 112, and the bucket 113 in the site coordinate system based on the posture angle of the work equipment 110 and the posture information of the swing body 120 acquired by the data acquisition unit 1701 (Step S10).

The guidance information generation unit 1706 generates the guidance information shown in FIG. 5 based on the positions of the feature points specified in step S9, the positions of the boom 111, the arm 112, and the bucket 113 specified in step S10, and the posture information of the swing body 120 acquired in step S1 (step S11). The display control unit 1707 outputs the display signal for displaying the guidance information to the display device 128 (step S12).

(Learning Method)

Figure 9:
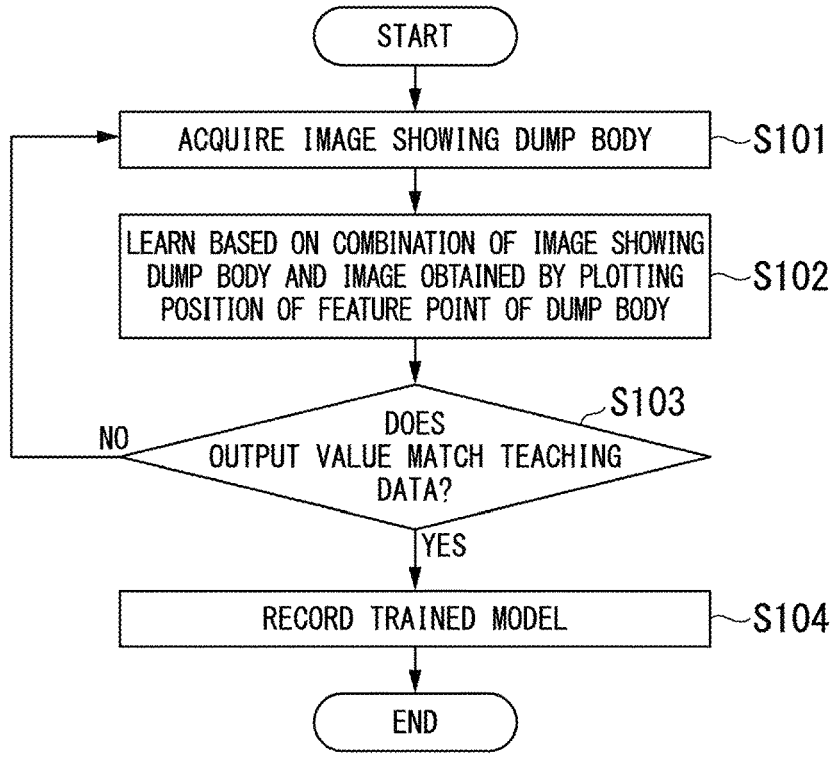
FIG. 9 is a flowchart showing a learning method of a feature point specifying model according to the first embodiment.

FIG. 9 is a flowchart showing a learning method of the feature point specifying model M1 according to the first embodiment. The data acquisition unit 1701 acquires the training data (step S101). For example, the training data in the feature point specifying model M1 is an image showing the dump body 210. The training data may be acquired from an image captured by the stereo camera 125. The training data may be acquired from an image captured by another work machine. An image showing a work machine different from the dump truck, for example, an image showing a dump body of a wheel loader may be used as the training data. It is possible to improve robustness of dump body recognition by using dump bodies of various types of work machines as the training data.

Next, the learning unit 1801 performs training of the feature point specifying model M1. The learning unit 1801 performs training of the feature point specifying model M1 using the combination of the training data acquired in step S101 and the teaching data which is the image obtained by plotting the positions of the feature points of the dump body, as the dataset for learning (step S102). For example, the learning unit 1801 uses the training data as an input to perform calculation processing of the neural network 140 in a forward propagation direction. Accordingly, the learning unit 1801 obtains an output value output from the output layer 143 of the neural network 140. The dataset for learning may be stored in the main memory 92 or the storage 93. Next, the learning unit 1801 calculates an error between the output value from the output layer 143 and the teaching data. The output value from the output layer 143 is a value representing the probability of a pixel being the feature point, and the teaching data is the information obtained by plotting the position of the feature point. The learning unit 1801 calculates an error of the weight of each connection between the neurons and an error of the threshold value of each neuron by backpropagation from the calculated error of the output value. The learning unit 1801 updates the weight of each connection between the neurons and the threshold value of each neuron based on the calculated errors.

The learning unit 1801 determines whether or not an output value from the feature point specifying model M1 matches the teaching data (step S103). It may be determined that the output value matches the teaching data when an error between the output value and the teaching data is within a predetermined value. In a case where the output value from the feature point specifying model M1 does not match the teaching data (step S103: NO), the above processing is repeated until the output value from the feature point specifying model M1 matches the teaching data. As a result, the parameters of the feature point specifying model M1 are optimized, and the feature point specifying model M1 can be trained.

In a case where the output value from the feature point specifying model M1 matches the teaching data (step S103: YES), the learning unit 1801 records the feature point specifying model M1 as a trained model including the parameters optimized by the training in the storage 93 (step S104).

Figure 10:
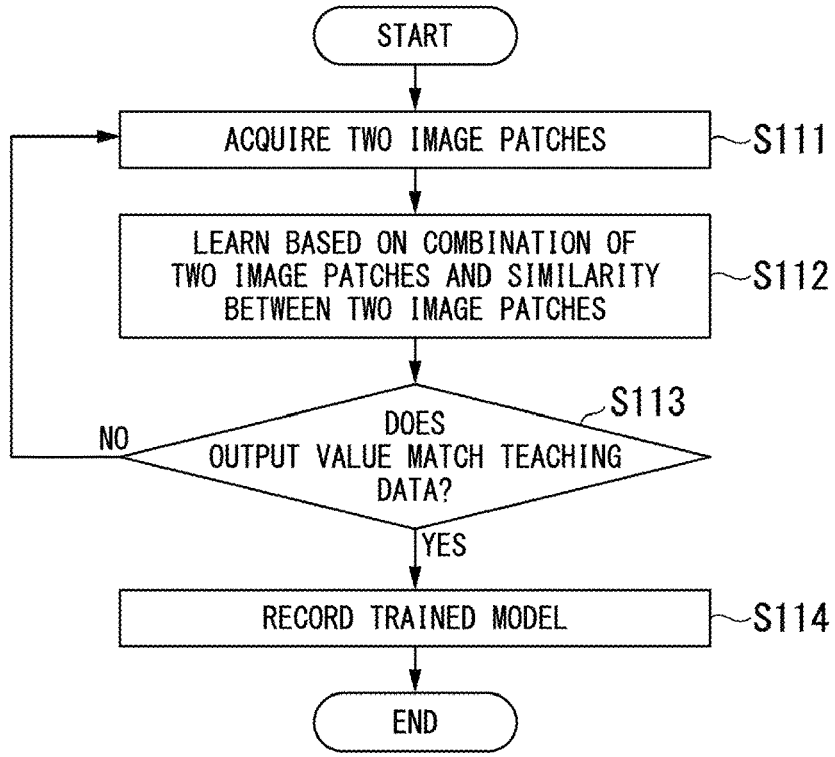
FIG. 10 is a flowchart showing a learning method of a similarity specifying model according to the first embodiment.

FIG. 10 is a flowchart showing a learning method of the similarity specifying model M2 according to the first embodiment. The data acquisition unit 1701 acquires the training data (step S111). For example, the training data in the similarity specifying model M2 is two image patches having a size extracted by the corresponding point specifying unit. The training data may be generated from an image captured by the stereo camera 125. The training data may be generated from any image. An image showing a work machine different from the dump truck, for example, an image showing a dump body of a wheel loader may be used as the training data.

Next, the learning unit 1801 performs training of the similarity specifying model M2. The learning unit 1801 performs training of the similarity specifying model M2 using the combination of the training data acquired in step S111 and the teaching data which is the similarity between the image patches related to the training data, as the dataset for learning (step S112). For example, the learning unit 1801 uses each of the two images related to the training data as inputs to perform the calculation processing of the neural network 140 in a forward propagation direction. The neural network 140 calculates the feature amounts of the two images. The distance calculation unit 150 calculates the distance between the two feature amounts. The distance calculated by the distance calculation unit 150 is equivalent to the similarity between the two images. The dataset for learning may be stored in the main memory 92 or the storage 93. Next, the learning unit 1801 calculates an error between the distance output from the distance calculation unit 150 and the similarity which is the teaching data. The learning unit 1801 calculates an error of the weight of each connection between the neurons and an error of the threshold value of each neuron by backpropagation from the calculated error of the output value. The learning unit 1801 updates the weight of each connection between the neurons and the threshold value of each neuron based on the calculated errors.

The learning unit 1801 determines whether or not the output value from the similarity specifying model M2 matches the teaching data (step S113). It may be determined that the output value matches the teaching data when an error between the output value and the teaching data is within a predetermined value. In a case where the output value from the similarity specifying model M2 does not match the teaching data (step S113: NO), the above processing is repeated until the output value from the similarity specifying model M2 matches the teaching data. As a result, the parameters of the similarity specifying model M2 are optimized, and the similarity specifying model M2 can be trained.

In a case where the output value from the similarity specifying model M2 matches the teaching data (step S113: YES), the learning unit 1801 records the similarity specifying model M2 as a trained model including the parameters optimized by the training in the storage 93 (step S114).

(Operation and Effects)

As described above, according to the first embodiment, the control device 127 inputs the captured image showing the drop target of the transport object to the position specifying model, which is the trained model, to specify the positions of the feature points of the drop target at the site shown in the captured image. As described above, the control device 127 according to the first embodiment can specify the position of the drop target regardless of an edge included in the image. Accordingly, the control device 127 according to the first embodiment can robustly specify the position of the drop target of the transport object even though a straight line part such as a rut is shown in the captured image. In a case where the position of the drop target is specified by using the stereo camera, the three-dimensional position of the drop target can be specified. Depending on the embodiment, the processing of steps S2 to S7 and steps S9 to S12 among the processing by the control device 127 shown in FIG. 8 may not necessarily be performed.

The control device 127 according to the first embodiment displays the guidance information. Accordingly, the operator can recognize the drop target of the transport object even in a case where the drop target is difficult to be visually recognized depending on a relative position between the work machine and the drop target. The work efficiency can be improved by operating the work equipment 110 while referring to the drop target displayed as the guidance information.

The control device 127 according to the first embodiment specifies the positions of the feature points on the captured image from the captured image and specifies the positions of the feature points in the site coordinate system from the positions of the feature points on the captured image based on the posture of the stereo camera 125. Accordingly, even in a case where the posture of the stereo camera 125 changes due to the operation of the hydraulic excavator 100, the positions of the feature points in the site coordinate system can be specified. In another embodiment, in a case where the stereo camera 125 is fixedly installed at the construction site, the positions of the feature points in the site coordinate system may be specified from the captured image without obtaining the posture information of the stereo camera 125.

The control device 127 according to the first embodiment uses the feature point specifying model M1 that extracts the feature points from the right-eye image and the similarity specifying model M2 that specifies the similarity between the partial right-eye images and the partial left-eye images to specify the feature points in the right-eye image and the feature points in the left-eye image. It is possible to clarify a cause in a case where the position of the feature point cannot be appropriately acquired by separating the model that extracts the feature points of the right-eye image and the model that extracts the feature points of the left-eye image. Since the input image to the similarity specifying model M2 is smaller than the input image to the feature point specifying model M1, a calculation amount is small in the similarity specifying model M2, and therefore, the calculation can be ended faster compared with a case where the both the right-eye image and the left-eye image are calculated by the feature point specifying model M1. The control device 127 according to the first embodiment uses the feature point specifying model M1 to extract the feature points from the right-eye image and uses the similarity specifying model M2 to specify the feature points in the left-eye image, but the present invention is not limited thereto. For example, in another embodiment, the control device 127 may use the feature point specifying model M1 to extract the feature points from the left-eye image and use the similarity specifying model M2 to specify the feature points in the right-eye image.

Second Embodiment

Hereinafter, a second embodiment will be described with reference to the drawings. The control device 127 according to the first embodiment uses the feature point specifying model M1 and the similarity specifying model M2 to respectively specify the positions of the feature points on the right-eye image and the positions of the feature points on the left-eye image. On the contrary, the control device 127 according to the second embodiment uses one trained model to specify the positions of the feature points on the right-eye image and the positions of the feature points on the left-eye image.

(Configuration of Control Device)

Figure 11:
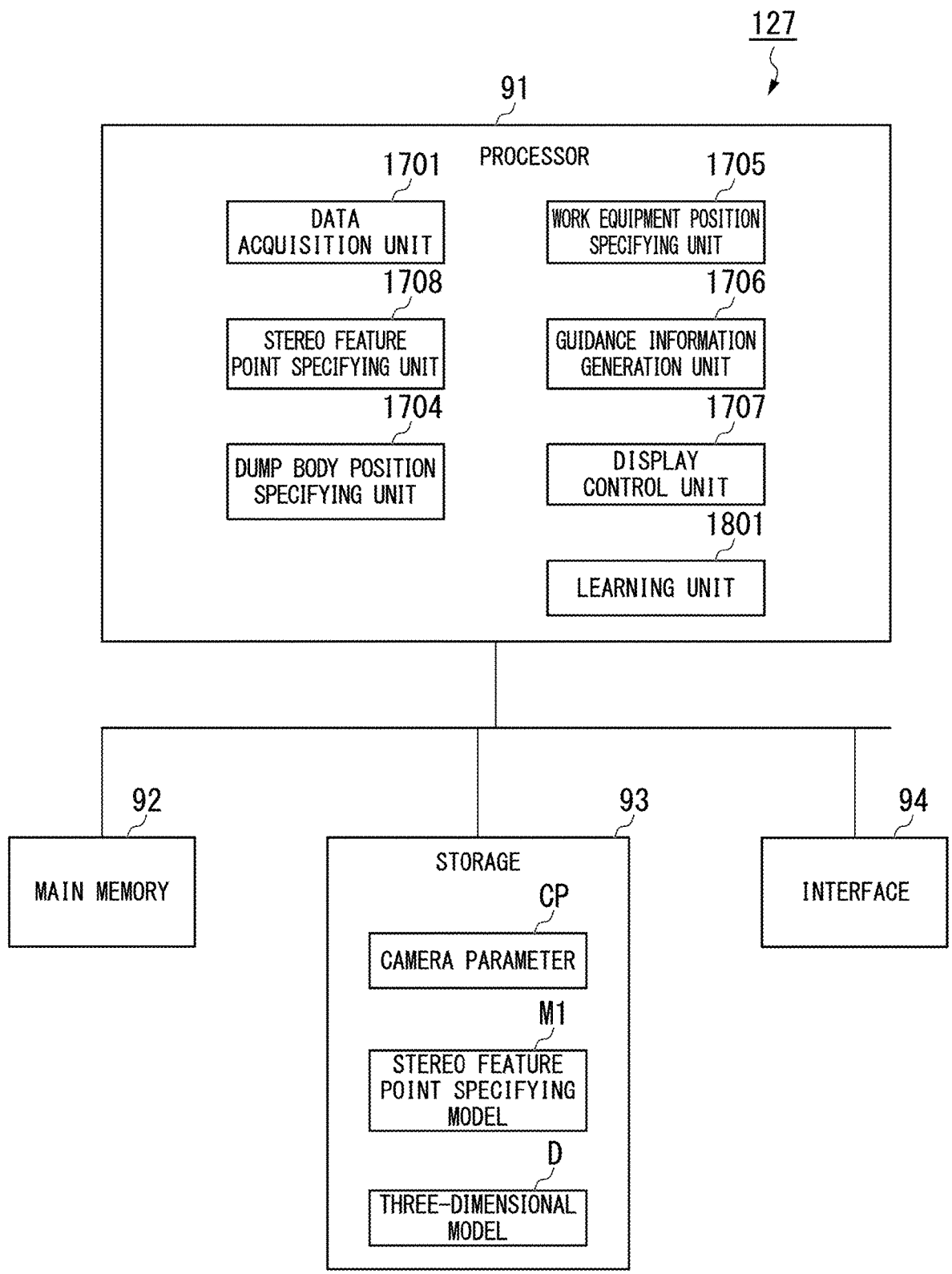
FIG. 11 is a schematic block diagram showing a configuration of a control device according to a second embodiment.

FIG. 11 is a schematic block diagram showing a configuration of a control device according to the second embodiment.

The processor 91 according to the second embodiment includes a stereo feature point specifying unit 1708 instead of the feature point specifying unit 1702 and the corresponding point specifying unit 1703 according to the first embodiment. The storage 93 stores a stereo feature point specifying model M3 instead of the feature point specifying model M1 and the similarity specifying model M2 according to the first embodiment.

The stereo feature point specifying unit 1708 inputs the stereo image acquired by the data acquisition unit 1701 to the stereo feature point specifying model M3 stored in the storage 93 to specify the positions of the plurality of feature points of the dump body 210 shown in each of the right-eye image and the left-eye image. The stereo feature point specifying unit 1708 is an example of a stereo position specifying unit.

The stereo feature point specifying model M3 is realized by, for example, a trained model of deep neural network (DNN). That is, the stereo feature point specifying model M3 includes the neural network 140 shown in FIG. 5. The stereo feature point specifying model M3 is a trained model which is trained, when a stereo image showing the dump body 210 of the dump truck 200 is input, to output the positions of the feature points of the dump body 210 in each of the right-eye image and the left-eye image of the stereo image. The stereo feature point specifying model M3 may be generated, for example, by transfer learning of a stereo matching model. The stereo matching model is a trained model for stereo matching and is, for example, a model that outputs a depth image indicating a depth of the input stereo image. The stereo matching model may not necessarily be trained by the stereo showing the dump truck. Specifically, the stereo feature point specifying model M3 is a model in which an output layer of the stereo matching model is replaced so as to output the positions of the feature points of the dump body 210 in the right-eye image and the left-eye image of the stereo image and values of an input layer and some of intermediate layers on the input layer side are fixed, and is trained by using a combination of the stereo image showing the dump body 210 of the dump truck 200 and the positions of the plurality of feature points in the right-eye image and the left-eye image as teaching data. The stereo feature point specifying model M3 is an example of the position specifying model.

(Display Method)

Figure 12:
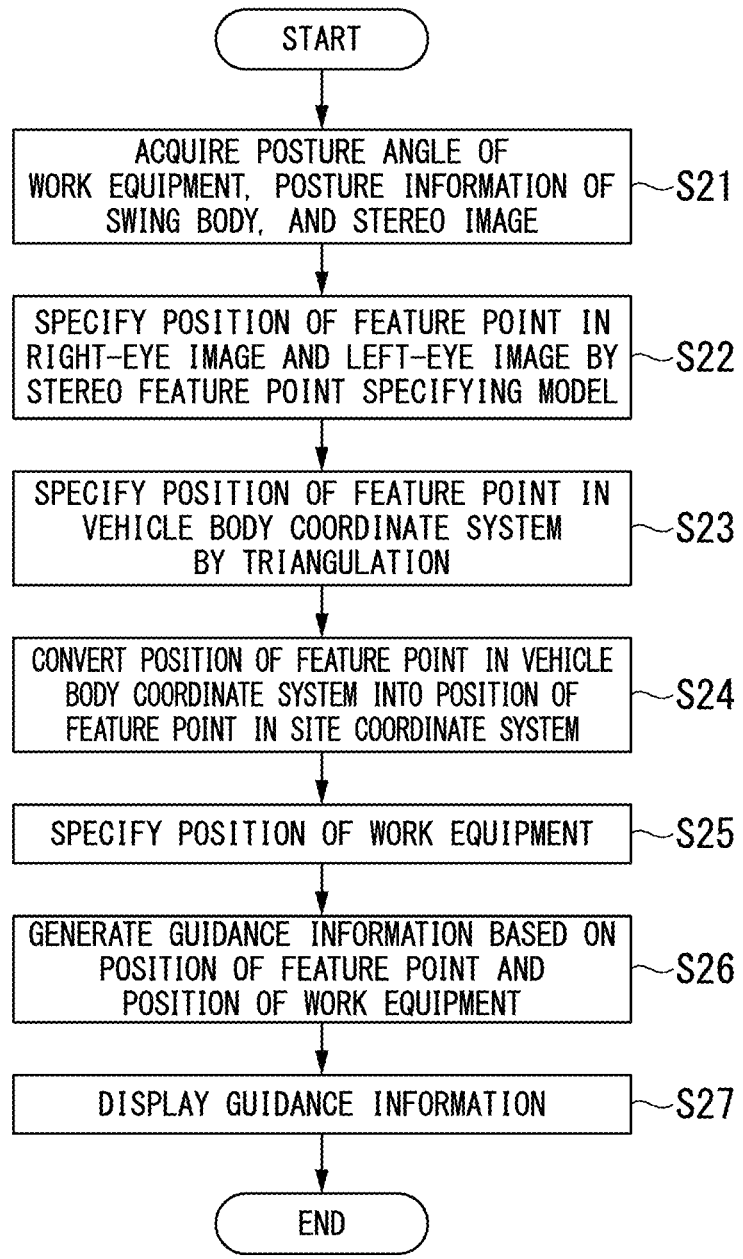
FIG. 12 is a flowchart showing a display method of guidance information by the control device according to the second embodiment.

FIG. 12 is a flowchart showing a display method of the guidance information by the control device according to the second embodiment.

First, the data acquisition unit 1701 acquires, through the interface 94, the posture angle of the work equipment 110 from the work equipment position detector 122, acquires the position and azimuth direction of the swing body 120 from the position and azimuth calculator 123, acquires the inclination of the swing body 120 from the inclination detector 124, and acquires the stereo image from the stereo camera 125 (step S21). Next, the stereo feature point specifying unit 1708 inputs the stereo image acquired by the data acquisition unit 1701 to the stereo feature point specifying model M3 stored in the storage 93 to specify the positions of the plurality of feature points of the dump body 210 shown in the right-eye image and the left-eye image (step S22).

The dump body position specifying unit 1704 specifies the positions of the feature points in the vehicle body coordinate system by triangulation based on the feature points of the right-eye image and the left-eye image specified in step S22 and the camera parameter stored in the storage 93 (step S23). Next, the dump body position specifying unit 1704 converts the positions of the feature points in the vehicle body coordinate system to the positions of the feature points in the site coordinate system based on the posture information of the swing body 120 (step S24).

The work equipment position specifying unit 1705 specifies the positions of the boom 111, the arm 112, and the bucket 113 in the site coordinate system based on the posture angle of the work equipment 110 and the posture information of the swing body 120 acquired in step S21 (step S25).

The guidance information generation unit 1706 generates the guidance information based on the positions of the feature points specified in step S23, the positions of the boom 111, the arm 112, and the bucket 113 specified in step S25, and the posture information of the swing body 120 acquired in step S21 (step S26). The display control unit 1707 outputs the display signal for displaying the guidance information to the display device 128 (step S27).

(Learning Method)

Figure 13:
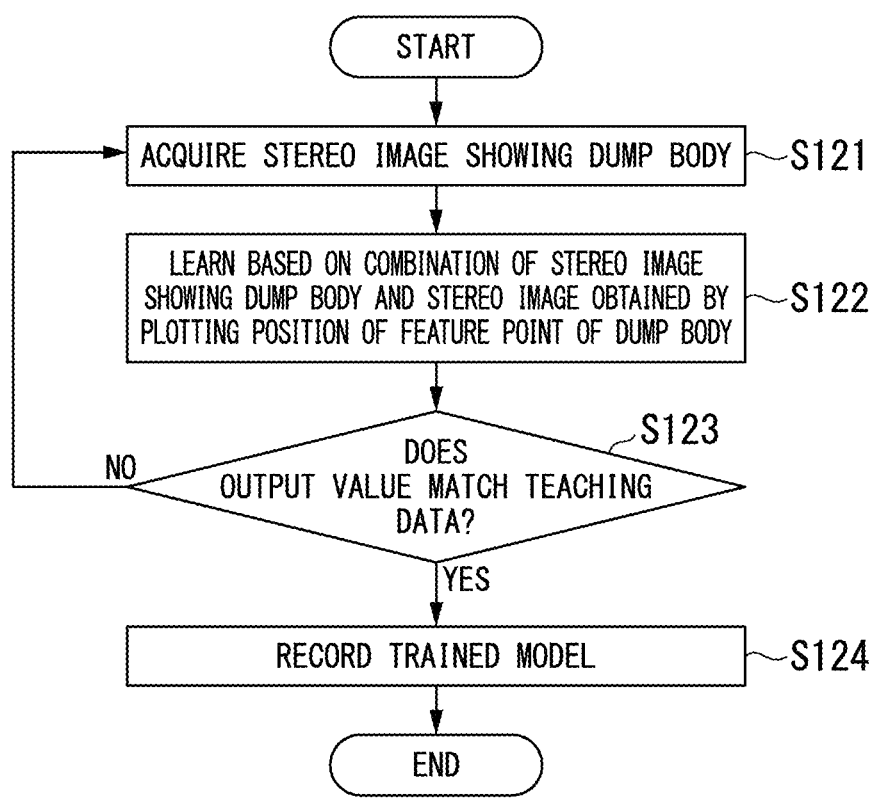
FIG. 13 is a flowchart showing a learning method of a stereo feature point specifying model according to the second embodiment.

FIG. 13 is a flowchart showing a learning method of the stereo feature point specifying model M3 according to the second embodiment. The data acquisition unit 1701 acquires the training data (step S121). For example, the training data is a stereo image showing the dump body 210. The training data may be acquired from a stereo image captured by another work machine.

Next, the learning unit 1801 performs training of the stereo feature point specifying model M3. Parameters of an existing trained stereo matching model may be used as initial values of the parameters of the input layer 141 and some of the intermediate layers 142 of the stereo feature point specifying model M3. The learning unit 1801 performs training of the training model using the combination of the stereo image showing the dump body 210 as the training data and the image obtained by plotting the positions of the feature points of the dump body in the right-eye image and the image obtained by plotting the positions of the feature points of the dump body in the left-eye image as the teaching data, as the dataset for learning (step S122). That is, the teaching data is the stereo image obtained by plotting the positions of the feature points of the dump body. The dataset for learning may be stored in the main memory 92 or the storage 93.

The learning unit 1801 determines whether or not an output value from the stereo feature point specifying model M3 matches the teaching data (step S123). It may be determined that the output value matches the teaching data when an error between the output value and the teaching data is within a predetermined value. In a case where the output value from the stereo feature point specifying model M3 does not match the teaching data (step S123: NO), the above processing is repeated until the output value from the stereo feature point specifying model M3 matches the teaching data. As a result, the parameters of the training model are optimized, and the training model can be trained.

In a case where the output value from the stereo feature point specifying model M3 matches the teaching data (step S123: YES), the control device 127 stores the stereo feature point specifying model M3, which is a trained model including the parameters optimized by the training as the trained parameters, in the storage 93 (step S124).

(Operation and Effects)

As described above, according to the second embodiment, the control device 127 uses the stereo feature point specifying model M3 that extracts the feature points from the stereo image to specify the feature points in the right-eye image and the feature points in the left-eye image. The stereo feature point specifying model M3 can be obtained by reinforcement learning of the stereo matching model. Therefore, it is possible to generate the stereo feature point specifying model M3 at a low learning cost.

Third Embodiment

Hereinafter, a third embodiment will be described with reference to drawings. The control device 127 according to the first embodiment and the second embodiment specifies the positions of the feature points on the image by using the trained model and specifies the three-dimensional positions of the feature points by triangulation based on the specified positions. On the contrary, the control device 127 according to the third embodiment specifies the three-dimensional positions of the feature points by using a trained model.

(Configuration of Control Device)

Figure 14:
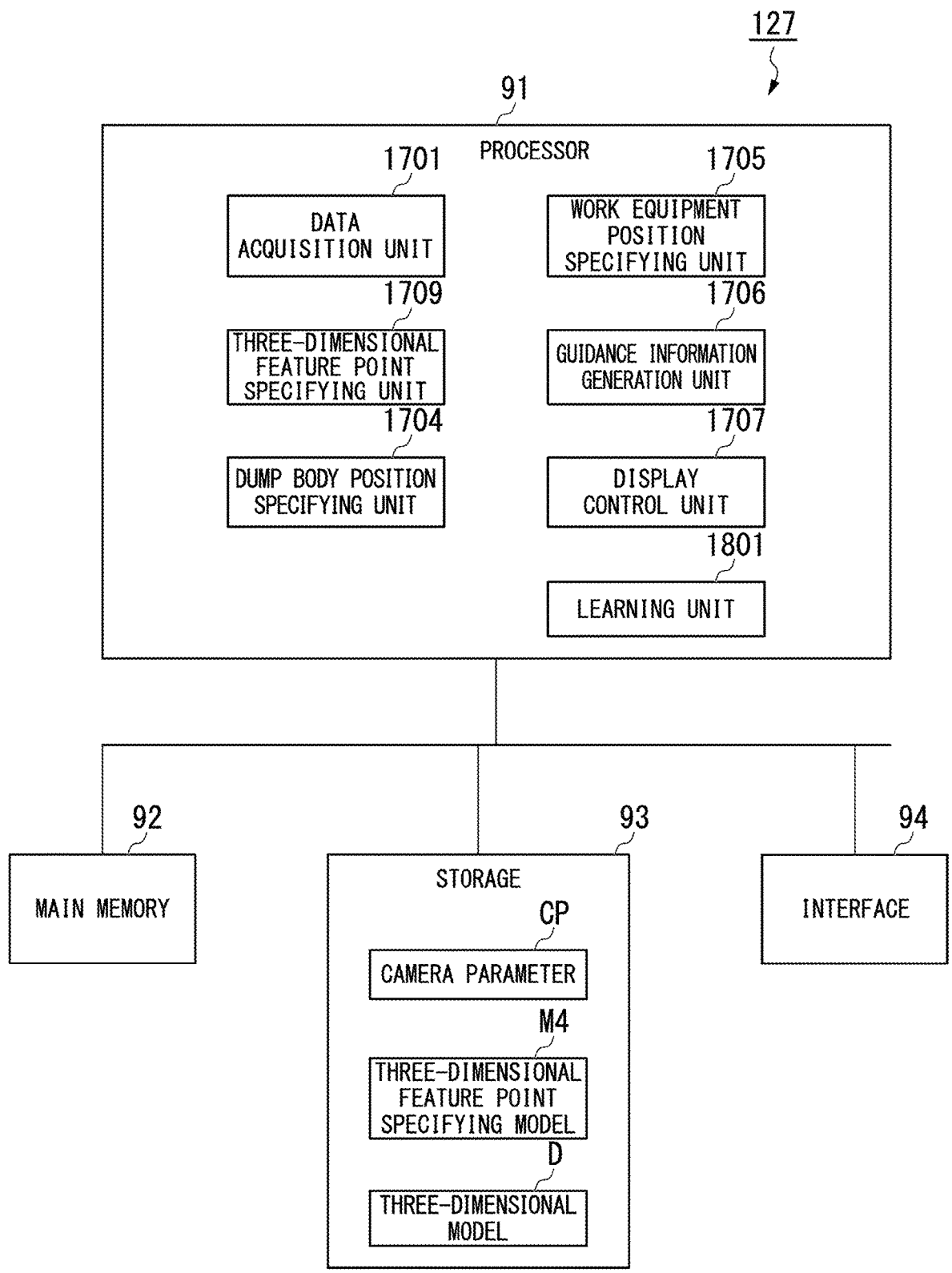
FIG. 14 is a schematic block diagram showing a configuration of a control device according to a third embodiment.

FIG. 14 is a schematic block diagram showing a configuration of a control device according to the third embodiment.

The processor 91 according to the third embodiment includes a three-dimensional feature point specifying unit 1709 instead of the feature point specifying unit 1702 and the corresponding point specifying unit 1703 according to the first embodiment. The storage 93 stores a three-dimensional feature point specifying model M4 instead of the feature point specifying model M1 and the similarity specifying model M2 according to the first embodiment. The storage 93 according to the third embodiment may not necessarily store the camera parameter.

The three-dimensional feature point specifying unit 1709 inputs the stereo image acquired by the data acquisition unit 1701 to the three-dimensional feature point specifying model M4 stored in the storage 93 to specify the positions of the plurality of feature points of the dump body 210 in the vehicle body coordinate system.

The three-dimensional feature point specifying model M4 is realized by, for example, a trained model of DNN. The three-dimensional feature point specifying model M4 is a trained model which is trained, when a stereo image showing the dump body 210 of the dump truck 200 is input, to output the positions of the feature points in the vehicle body coordinate system. For example, the stereo feature point specifying model M3 is trained by using the combination of the stereo image showing the dump body 210 of the dump truck 200 and the positions of the plurality of feature points in the vehicle body coordinate system as the teaching data.
(Display Method)

Figure 15:
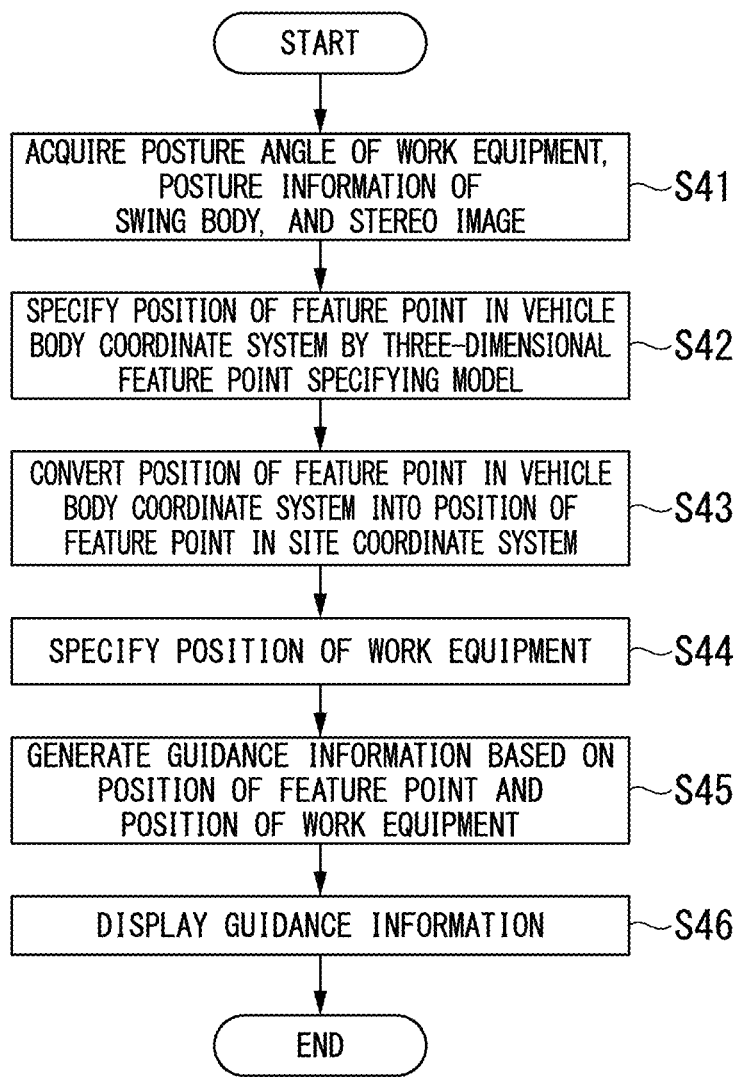
FIG. 15 is a flowchart showing a display method of guidance information by the control device according to the third embodiment.

FIG. 15 is a flowchart showing a display method of the guidance information by a control device according to the third embodiment.

First, the data acquisition unit 1701 acquires, through the interface 94, the posture angle of the work equipment 110 from the work equipment position detector 122, acquires the position and azimuth direction of the swing body 120 from the position and azimuth calculator 123, acquires the inclination of the swing body 120 from the inclination detector 124, and acquires the stereo image from the stereo camera 125 (step S41). Next, the three-dimensional feature point specifying unit 1709 inputs the stereo image acquired by the data acquisition unit 1701 to the three-dimensional feature point specifying model M4 stored in the storage 93 to specify the positions of the plurality of feature points of the dump body 210 in the vehicle body coordinate system (step S42). The dump body position specifying unit 1704 converts the positions of the feature points in the vehicle body coordinate system into the positions of the feature points in the site coordinate system based on the posture information of the swing body 120 acquired in step S41 (step S43).

The work equipment position specifying unit 1705 specifies the positions of the boom 111, the arm 112, and the bucket 113 in the site coordinate system based on the posture angle of the work equipment 110 and the posture information of the swing body 120 acquired in step S41 (step S44).

The guidance information generation unit 1706 generates the guidance information based on the positions of the feature points specified in step S43, the positions of the boom 111, the arm 112, and the bucket 113 specified in step S44, and the posture information of the swing body 120 acquired in step S41 (step S45). The display control unit 1707 outputs the display signal for displaying the guidance information to the display device 128 (step S46).
(Learning Method)

Figure 16:
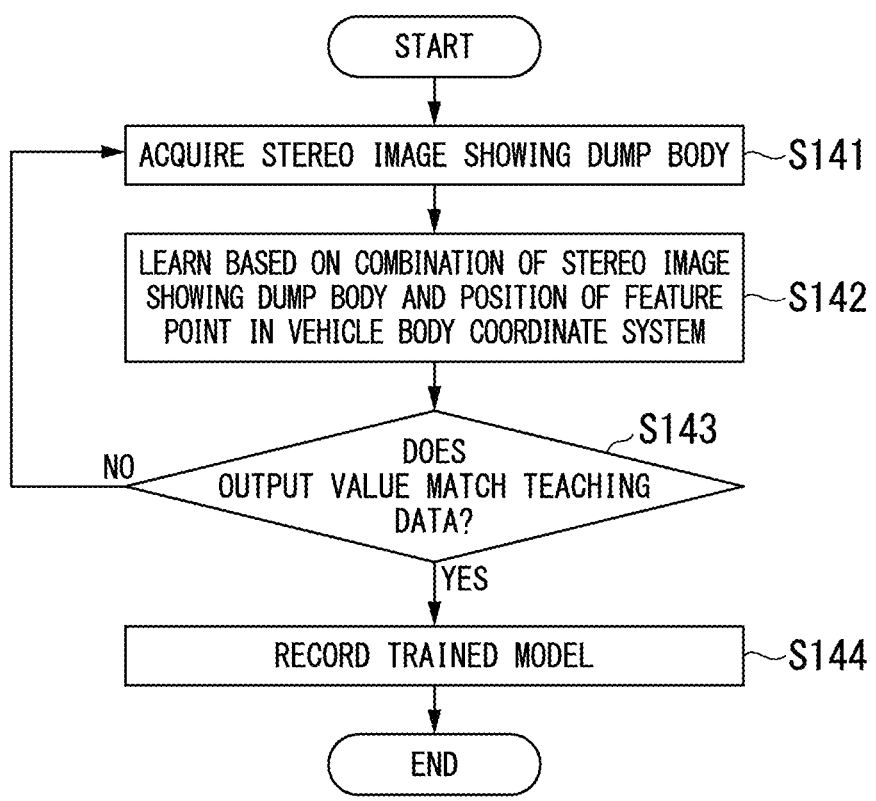
FIG. 16 is a flowchart showing a learning method of a three-dimensional feature point specifying model according to the third embodiment.

FIG. 16 is a flowchart showing a learning method of the three-dimensional feature point specifying model M4 according to the third embodiment. The data acquisition unit 1701 acquires the training data (step S141). For example, the training data is the stereo image showing the dump body 210. The training data may be acquired from an image captured by the stereo camera 125. The training data may be acquired from an image captured by another work machine.

Next, the learning unit 1801 performs training of the three-dimensional feature point specifying model M4. The learning unit 1801 performs training of the three-dimensional feature point specifying model M4 using the combination of the stereo image showing the dump body 210 which is the training data and the positions of the plurality of feature points in the vehicle body coordinate system which is the teaching data, as the dataset for learning (step S142). The dataset for learning may be stored in the main memory 92 or the storage 93.

The learning unit 1801 determines whether or not an output value from the three-dimensional feature point specifying model M4 matches the teaching data (step S143). It may be determined that the output value matches the teaching data when an error between the output value and the teaching data is within a predetermined value. In a case where the output value from the three-dimensional feature point specifying model M4 does not match the teaching data (step S143: NO), the above processing is repeated until the output value matches the teaching data. As a result, the parameters of the three-dimensional feature point specifying model M4 are optimized, and the three-dimensional feature point specifying model M4 can be trained.

In a case where the output value from the three-dimensional feature point specifying model M4 matches the teaching data (step S143: YES), the learning unit 1801 stores the three-dimensional feature point specifying model M4, which is a trained model including the parameters optimized by the training as the trained parameters, in the storage 93 (step S144).
(Operation and Effects)

As described above, according to the third embodiment, the control device 127 uses the three-dimensional feature point specifying model M4 that extracts the three-dimensional positions of the feature points from the stereo image to specify the positions of the feature points in the vehicle body coordinate system. Accordingly, the control device 127 can specify the position of the dump truck 200 with a small number of configurations.

Fourth Embodiment

Hereinafter, a fourth embodiment will be described with reference to drawings. The control device 127 according to the first embodiment uses the feature point specifying model M1 and the similarity specifying model M2 to respectively specify the positions of the feature points on the right-eye image and the positions of the feature points on the left-eye image. On the contrary, the control device 127 according to the fourth embodiment uses the feature point specifying model M1 and a stereo matching model M5 that generates a depth image from the stereo image to specify the three-dimensional positions of the feature points.
(Configuration of Control Device)

Figure 17:
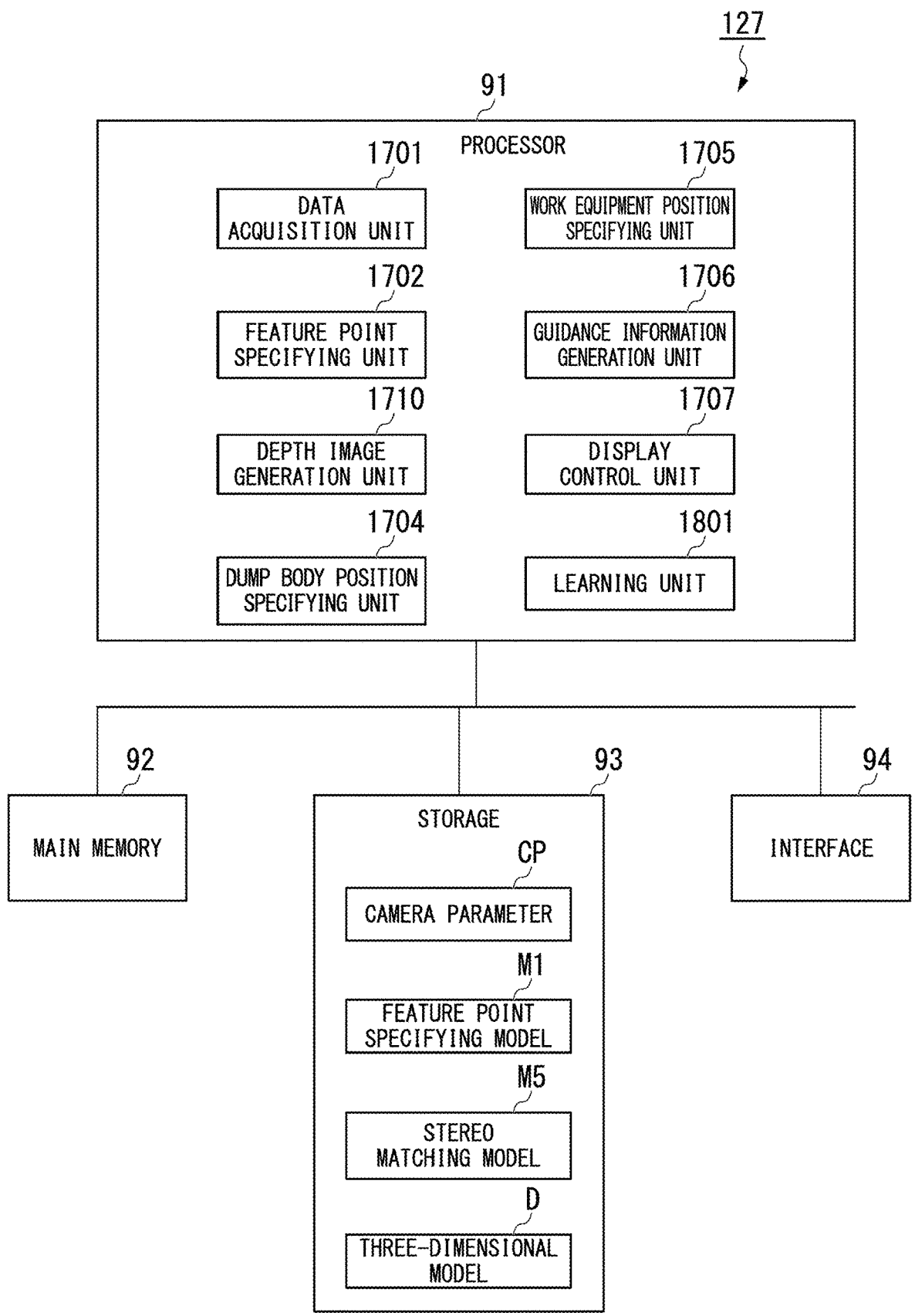
FIG. 17 is a schematic block diagram showing a configuration of a control device according to a fourth embodiment.

FIG. 17 is a schematic block diagram showing a configuration of a control device according to the fourth embodiment.

The processor 91 according to the fourth embodiment includes a depth image generation unit 1710 instead of the corresponding point specifying unit 1703 according to the first embodiment. The storage 93 stores the stereo matching model M5 instead of the similarity specifying model M2 according to the first embodiment. The storage 93 according to the fourth embodiment may not necessarily store the camera parameter.

The depth image generation unit 1710 inputs the stereo image acquired by the data acquisition unit 1701 to the stereo matching model M5 stored in the storage 93 to output a depth image including depth information for each pixel of the right-eye image. The stereo matching model M5 is realized, for example, by a trained model of DNN. The stereo matching model M5 is a trained model for the stereo matching and is, for example, a model that, when a stereo image is input, outputs the depth image indicating the depth of the stereo image. The stereo matching model may not necessarily be trained by the stereo image showing the dump truck.
(Display Method)

Figure 18:
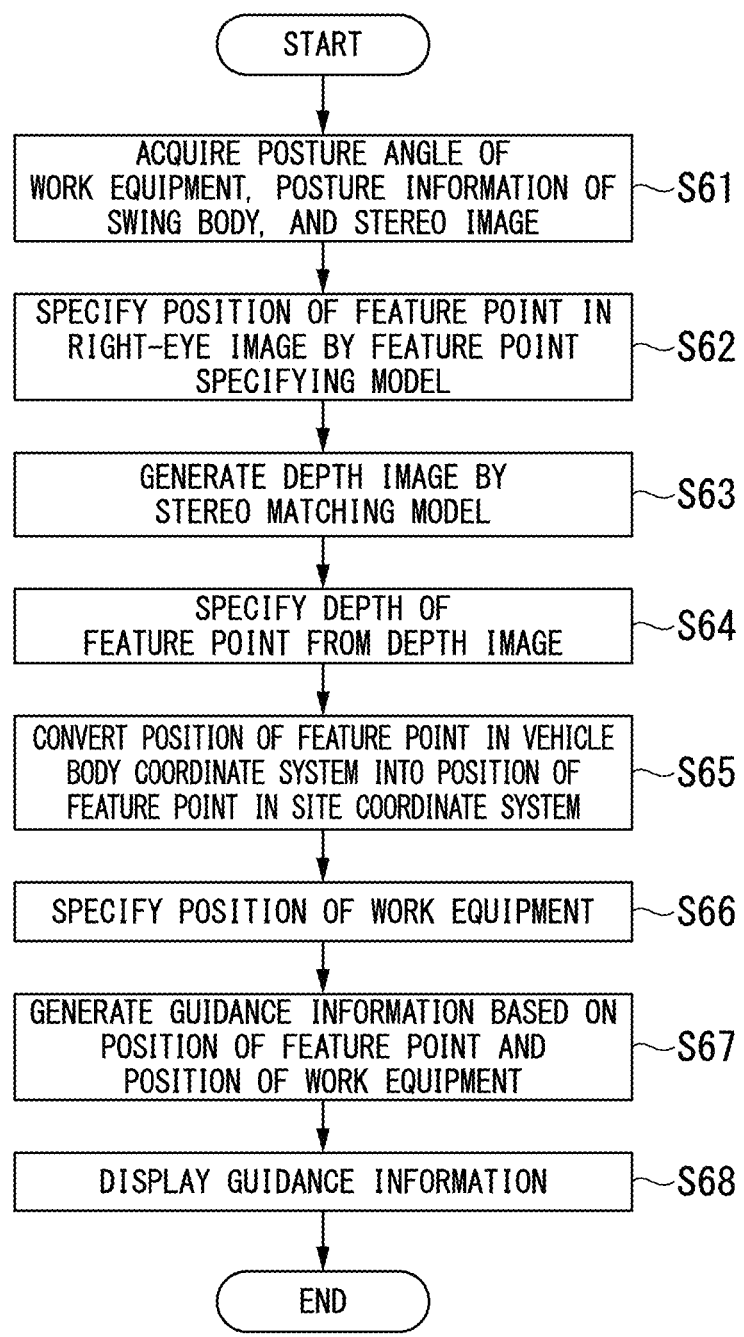
FIG. 18 is a flowchart showing a display method of guidance information by the control device according to the fourth embodiment.

FIG. 18 is a flowchart showing a display method of the guidance information by the control device according to the fourth embodiment.

First, the data acquisition unit 1701 acquires, through the interface 94, the posture angle of the work equipment 110 from the work equipment position detector 122, acquires the position and azimuth direction of the swing body 120 from the position and azimuth calculator 123, acquires the inclination of the swing body 120 from the inclination detector 124, and acquires the stereo image from the stereo camera 125 (step S61). Next, the feature point specifying unit 1702 inputs the right-eye image of the stereo image acquired by the data acquisition unit 1701 to the feature point specifying model M1 stored in the storage 93 to specify the positions of the plurality of feature points of the dump body 210 shown in the right-eye image (step S62).

Next, the depth image generation unit 1710 inputs the stereo image acquired by the data acquisition unit 1701 to the stereo matching model M5 to generate the depth image (step S63). The dump body position specifying unit 1704 reads the depth corresponding to each feature point on the right-eye image specified in step S62 from the depth image generated in step S63 to specify the position of each feature point in the vehicle body coordinate system (step S64). Next, the dump body position specifying unit 1704 converts the positions of the feature points in the vehicle body coordinate system into the positions of the feature points in the site coordinate system based on the posture information of the swing body 120 (step S65).

The work equipment position specifying unit 1705 specifies the positions of the boom 111, the arm 112, and the bucket 113 in the site coordinate system based on the posture angle of the work equipment 110 and the posture information of the swing body 120 acquired by the data acquisition unit 1701 (step S66).

The guidance information generation unit 1706 generates the guidance information based on the positions of the feature points specified in step S65, the positions of the boom 111, the arm 112, and the bucket 113 specified in step S66, and the posture information of the swing body 120 acquired in step S61 (step S67). The display control unit 1707 outputs the display signal for displaying the guidance information to the display device 128 (step S68).

(Learning Method)

Figure 19:
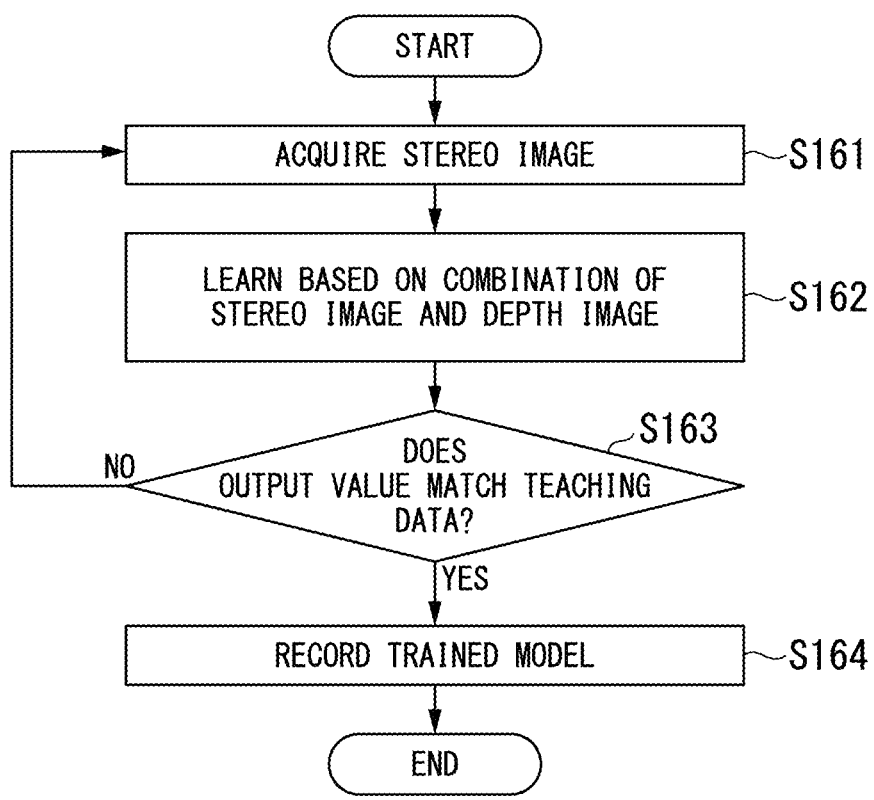
FIG. 19 is a flowchart showing a learning method of a stereo matching model according to the fourth embodiment.

FIG. 19 is a flowchart showing a learning method of the stereo matching model M5 according to the fourth embodiment. The data acquisition unit 1701 acquires the training data (step S161). For example, the training data is the stereo image. The training data may be acquired from an image captured by the stereo camera 125. The training data may be acquired from an image captured by another work machine. The training data may not necessarily be an image showing the dump body 210.

Next, the learning unit 1801 performs training of the stereo matching model M5. The learning unit 1801 performs training of the stereo matching model M5 using the combination of the stereo image which is the training data and the depth image representing the depth of each pixel of the right-eye image which is the teaching data, as the dataset for learning (step S162). The dataset for learning may be stored in the main memory 92 or the storage 93.

The learning unit 1801 determines whether or not an output value from the stereo matching model M5 matches the teaching data (step S163). It may be determined that the output value matches the teaching data when an error between the output value and the teaching data is within a predetermined value. In a case where the output value from the stereo matching model M5 does not match the teaching data (step S163: NO), the above processing is repeated until the output value matches the teaching data. As a result, the parameters of the stereo matching model M5 are optimized, and the stereo matching model M5 can be trained.

On the other hand, in a case where the output value from the stereo matching model M5 matches the teaching data (step S163: YES), the control device 127 stores the stereo matching model M5, which is a trained model including the parameters optimized by the training as the trained parameters, in the storage 93 (step S164).

(Operation and Effects)

As described above, according to the fourth embodiment, the control device 127 uses the stereo matching model M5 that generates the depth image from the stereo image to specify the positions of the feature points in the vehicle body coordinate system. Accordingly, the control device 127 can specify the position of the dump truck 200 by using a known stereo matching model M5.

The control device 127 according to the fourth embodiment extracts the feature points from the right-eye image using the feature point specifying model M1, but the present invention is not limited thereto. For example, in another embodiment, the control device 127 may use the feature point specifying model M1 to extract the feature points from the left-eye image.

Fifth Embodiment

Hereinafter, a fifth embodiment will be described with reference to drawings. The control device 127 according to the first to fourth embodiments generates the guidance information based on the specified positions of the feature points of the dump body 210 and presents the guidance information to the operator. On the contrary, the control device 127 according to the fifth embodiment controls the loading operation of the work equipment based on the specified positions of the feature points of the dump body 210.

(Configuration of Control Device)

Figure 20:
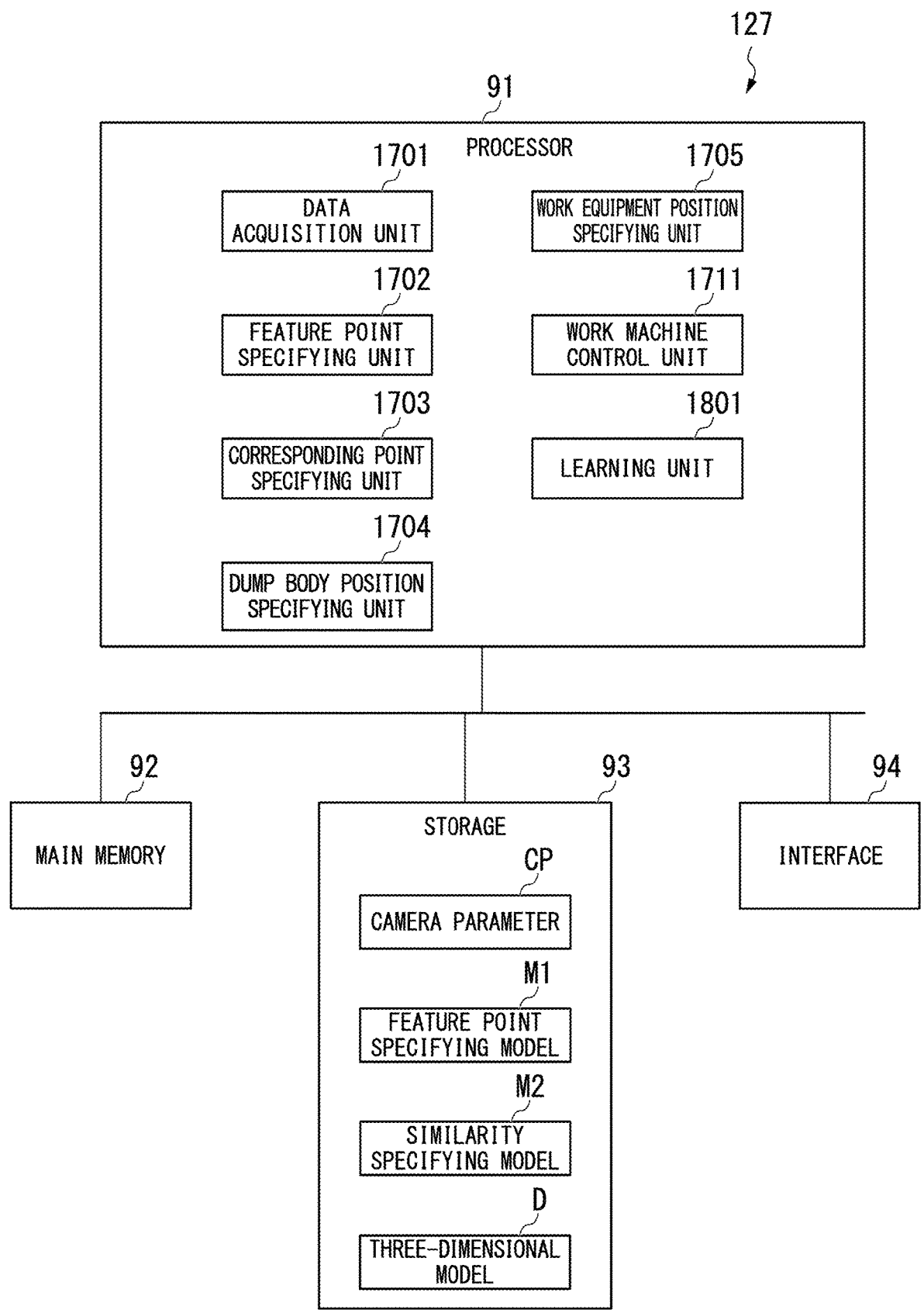
FIG. 20 is a schematic block diagram showing a configuration of a control device according to a fifth embodiment.

FIG. 20 is a schematic block diagram showing a configuration of a control device according to the fifth embodiment.

The processor 91 according to the fifth embodiment includes a work machine control unit 1711 instead of the guidance information generation unit 1706 and the display control unit 1707 according to the first embodiment.

The work machine control unit 1711 controls behavior of the swing body 120 and the work equipment 110 based on the positions of the feature points of the dump body 210 specified by the dump body position specifying unit 1704 in a case where an automatic loading button provided in the operation device 126 is pressed by the operator.

(Display Method)

Figure 21:
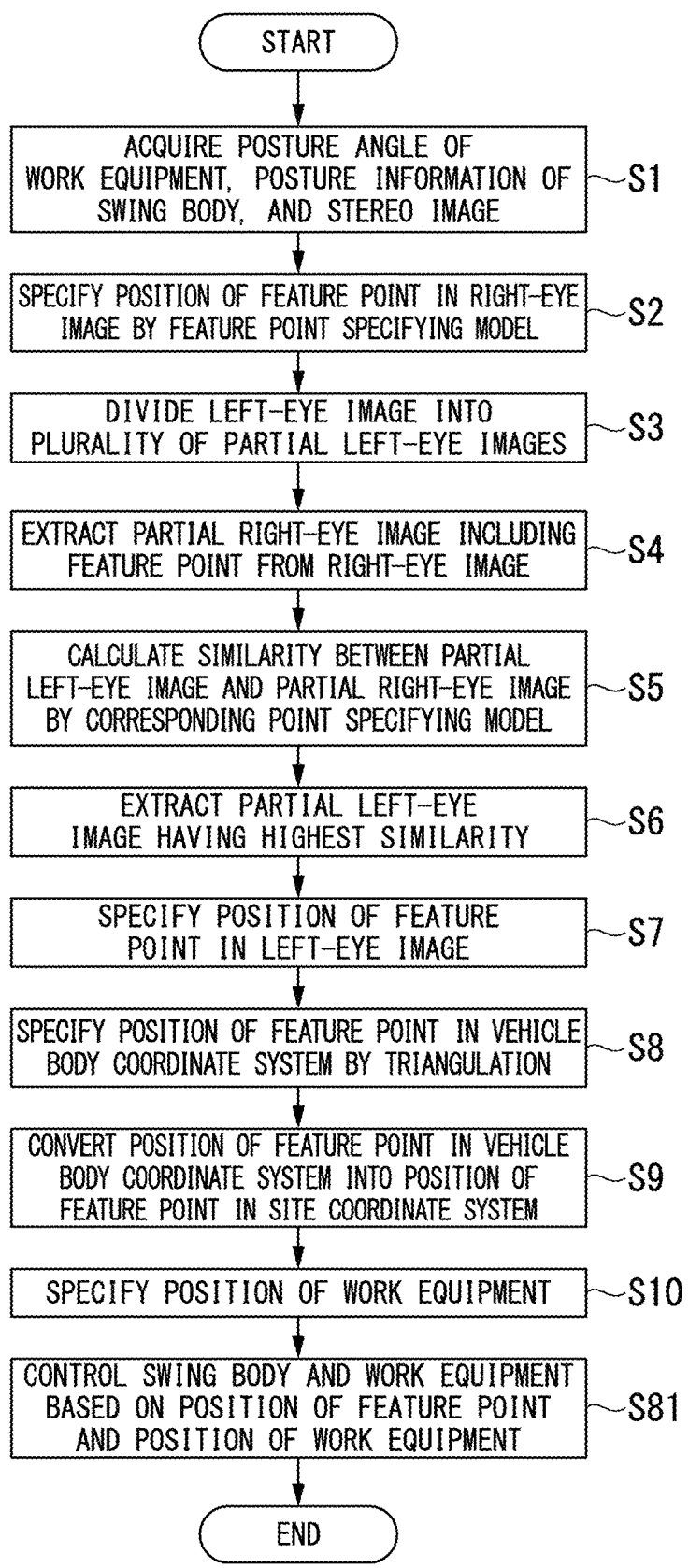
FIG. 21 is a flowchart showing a display method of guidance information by the control device according to the fifth embodiment.

FIG. 21 is a flowchart showing a control method for a hydraulic excavator according to the fifth embodiment.

When the automatic loading button is pressed, the control device 127 specifies the feature points of the dump body 210 and the position of the work equipment 110 in the site coordinate system by the same processing as in steps S1 to S10 of the first embodiment. The work machine control unit 1711 generates and outputs control signals for the swing body 120 and the work equipment 110 based on the feature points of the dump body 210 and the position of the work equipment 110 in the site coordinate system (step S81).

For example, the work machine control unit 1711 generates the control signal for raising the boom 111 in a case where a height of the bucket 113 is lower than a height of the feature point. When the height of the bucket 113 becomes equal to or higher than the height of the feature point, the work machine control unit 1711 stops the output of the control signal for raising the boom 111 and starts the output of the control signal for swing the swing body 120. In a case where the height of the bucket 113 is equal to or higher than the height of the feature point and a position of the bucket 113, when viewed in a plan view from above, is within a range of the dump body 210 specified from the position of the feature point, the work machine control unit 1711 stops the output of the control signal for swing the swing body 120 and generates the control signal for dumping the bucket 113.

(Operation and Effects)

As described above, according to the fifth embodiment, the control device 127 can automatically control the hydraulic excavator 100 based on the captured image. Since the control device 127 specifies the position of the dump body 210 using the trained model, it is possible to robustly specify the position of the drop target of the transport object even though a straight line part such as a rut is shown in the captured image.

The control device 127 according to the fifth embodiment uses the same trained model as the first embodiment to specify the position of the dump body 210, but the present invention is not limited thereto. The control device 127 may use the trained model according to the second to fourth embodiments to specify the position of the dump body 210.

The control device 127 according to the fifth embodiment uses the feature point specifying model M1 to extract the feature points from the right-eye image and uses the similarity specifying model M2 to specify the feature points in the left-eye image, but the present invention is not limited thereto. For example, in another embodiment, the control device 127 may use the feature point specifying model M1 to extract the feature points from the left-eye image and use the similarity specifying model M2 to specify the feature points in the right-eye image.

Another Embodiment

Although embodiments have been described in detail with reference to the drawings, a specific configuration is not limited to the above, and various design changes and the like can be made.

For example, although the control device 127 according to the above-described embodiment is mounted on the hydraulic excavator 100, the present invention is not limited thereto. For example, the control device 127 according to another embodiment may be provided in a remote server device. The control device 127 may be realized by a plurality of computers. In this case, part of the configuration of the control device 127 may be provided in the remote server device. That is, the control device 127 may be implemented as an image processing system composed of a plurality of devices. The hydraulic excavator 100 may be a fully autonomous type or a partially autonomous type hydraulic excavator. The display signal for displaying the guidance information may be transmitted to a remote cab for remote control of the work machine.

Although the drop target according to the above-described embodiment is the dump body 210 of the dump truck 200, the present invention is not limited thereto. For example, the drop target according to another embodiment may be another drop target such as a hopper.

Although the captured image according to the above-described embodiment is the stereo image, the present invention is not limited thereto. For example, in another embodiment, the calculation may be performed based on one image instead of the stereo image. In this case, the control device 127 can specify the positions of the feature points in the site coordinate system by using, for example, a trained model that generates depth information from one image.

Although the trained model according to the above-described embodiment is stored in the storage 93, the present invention is not limited thereto. For example, the trained model according to another embodiment may be expanded in the main memory 92 in a program form, and the processor 91 may perform inference.

According to the present invention, it is possible to accurately specify the position of a part of a drop target by using a trained model that outputs the position of a predetermined part of the drop target from an image.

The invention claimed is:

1. An image processing system comprising:
a storage including a position specifying model; and
a processor including
a data acquisition unit that acquires a captured image showing a drop target of a work machine in which a transport object is dropped; and
a position specifying unit that specifies a position of a predetermined part of the drop target shown in the captured image based on the captured image and the position specifying model, the position specifying model being a trained model which outputs a position of a predetermined part of a drop target shown in an image when the image is input,
the position specifying model outputting information indicating the position of the part in the image, and
the position specifying unit specifying a three-dimensional position of the part based on the output information indicating the position of the part in the image by inputting the captured image to the position specifying model.

2. The image processing system according to claim 1, wherein
the captured image is a stereo image including at least a first image and a second image captured by a stereo camera.

3. The image processing system according to claim 2, wherein
the processor further includes
a first position specifying unit that specifies a position of the part in the first image by inputting the first image to the position specifying model; and
a second position specifying unit that specifies a position of the part in the second image based on the specified position of the part in the first image,
the position specifying unit specifying a three-dimensional position of the part based on the position of the part in the first image and the position of the part in the second image.

4. The image processing system according to claim 3, wherein
the second position specifying unit specifies the position of the part in the second image based on a corresponding position specifying model, and the position specifying model is a trained model which outputs a position of a predetermined part of the drop target in the second image when the first image, the second image, and a position of a predetermined part of the drop target in the first image are input.

5. The image processing system according to claim 2, wherein
the processor further includes
a stereo position specifying unit that specifies a position of the part in the first image and a position of the part in the second image by inputting the first image and the second image to the position specifying model, the position specifying unit specifying a three-dimensional position of the part based on the position of the part in the first image and the position of the part in the second image.

6. The image processing system according to claim 1, wherein the data acquisition unit acquires a capturing posture of an imaging device that captures the captured image, and the position specifying unit specifies a three-dimensional position of the part at a site based on the specified position of the part and the capturing posture.

7. An image processing system comprising:

a data acquisition unit that acquires a captured image showing a drop target of a work machine in which a transport object is dropped; and a position specifying unit that specifies a position of a predetermined part of the drop target shown in the captured image based on the captured image and a position specifying model, the position specifying model being a trained model which outputs a position of a predetermined part of a drop target shown in an image when the image is input, the data acquisition unit acquiring a captured position of the captured image, the captured image being a stereo image including at least a first image and a second image captured by a stereo camera, the position specifying model outputting information indicating a three-dimensional position of the part with reference to the stereo camera when the first image and the second image are input, and the position specifying unit specifying a three-dimensional position of the part at a site based on the captured position and the output information indicating the three-dimensional position with reference to the stereo camera by inputting the first image and the second image into the position specifying model.

8. A display including the image processing system of claim 1, the display displaying information regarding the position of the predetermined part of the drop target of the transport object specified by the image processing system.

9. An image processing method comprising:

acquiring, from an imaging device, a captured image showing a drop target of a work machine in which a transport object is dropped; and specifying a position of a predetermined part of the drop target shown in the captured image based on the captured image and a position specifying model, the position specifying model being a trained model which outputs a position of a predetermined part of a drop target shown in an image when the image is input, the position specifying model outputting information indicating the position of the part in the image, and the position specifying unit specifying a three-dimensional position of the part based on the output information indicating the position of the part in the image by inputting the captured image to the position specifying model.

10. A method for generating a trained model of a position specifying model that outputs a position of a predetermined part of a drop target of a work machine in which a transport object is dropped when a captured image showing the drop target is input, the method comprising:

acquiring the captured image showing the drop target of the work machine in which the transport object is dropped; and generating a trained model by training the position specifying model using the captured image showing the drop target and information indicating the position of the predetermined part of the drop target shown in the captured image as a dataset for learning, the position specifying model outputting information indicating the position of the part in the image, and the position specifying unit specifying a three-dimensional position of the part based on the output information indicating the position of the part in the image by inputting the captured image to the position specifying model.

* * * * *